United States Patent
Saito

(10) Patent No.: US 7,138,447 B2
(45) Date of Patent: Nov. 21, 2006

(54) THERMOPLASTIC POLYMER COMPOSITION

(75) Inventor: Hidekazu Saito, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 220 days.

(21) Appl. No.: 10/482,417

(22) PCT Filed: Jul. 9, 2002

(86) PCT No.: PCT/JP02/06928

§ 371 (c)(1),
(2), (4) Date: Jan. 12, 2004

(87) PCT Pub. No.: WO03/006552

PCT Pub. Date: Jan. 23, 2003

(65) Prior Publication Data

US 2004/0176525 A1    Sep. 9, 2004

(30) Foreign Application Priority Data

Jul. 11, 2001  (JP) .............................. 2001-210572

(51) Int. Cl.
*C08K 5/34*  (2006.01)

(52) U.S. Cl. ...................... 524/100; 524/117; 524/127; 524/140; 524/174; 524/178; 524/236; 524/251; 524/257; 524/323

(58) Field of Classification Search ................ 524/100, 524/117, 127, 140, 174, 178, 236, 251, 257, 524/323
See application file for complete search history.

(56) References Cited

U.S. PATENT DOCUMENTS

RE37,036 E * 1/2001 Groves ....................... 524/174

FOREIGN PATENT DOCUMENTS

| EP | 0 796 899 | 9/1997 |
| JP | 6-107898 | 4/1994 |
| JP | 7-126474 | 5/1995 |
| JP | 8-143766 | 6/1996 |

* cited by examiner

*Primary Examiner*—Peter D. Mulcahy
(74) *Attorney, Agent, or Firm*—Oblon, Spivak, McClelland, Maier & Neustadt, PC.

(57) ABSTRACT

The present invention provides a thermoplastic polymer composition mainly comprising a block copolymer prepared by extending, with a specific polyurethane component, the polymer chain of a block copolymer, which may be hydrogenated, having a polymer block of an aromatic vinyl compound and a polymer block of a conjugated diene. The thermoplastic polymer composition according to the present invention is excellent in handling properties and melt-moldability, because it shows non-tackiness. By using the thermoplastic polymer composition according to the present invention, a molded article having high qualities can be produced with good productivity.

12 Claims, No Drawings

THERMOPLASTIC POLYMER COMPOSITION

TECHNICAL FIELD

The present invention relates to a thermoplastic polymer composition. The thermoplastic polymer composition of the present invention comprises a block copolymer prepared by extending, with a specific polyurethane component, the polymer chain of a block copolymer, which may be hydrogenated, having a polymer block of an aromatic vinyl compound and a polymer block of a conjugated diene. The thermoplastic polymer composition of the present invention is especially excellent in melt-retention stability.

BACKGROUND ART

Block copolymers having a styrene polymer block and a conjugated diene polymer block [hereinafter referred to as "styrene-conjugated diene block copolymer"] and the hydrogenated products thereof can be readily formulated into a molded article, because they can be plasticized and molten by heating. They have rubber elasticity at an ordinary temperature and show excellent balance between flexibility and mechanical characteristics. Therefore, in recent years, they have been widely used in various fields as one of the thermoplastic elastomers.

The styrene-conjugated diene block copolymers and the hydrogenated products thereof, which have low polarity, can be used in melt-adhesion or integral molding with a plastic of the same type having low polarity, but can be hardly melt-adhesive to a plastic having high polarity or a metal.

The British Patent No. 1581167 [GB 1581167] describes a composition in which a thermoplastic resin having specific properties is blended with a styrene-conjugated diene block copolymer and/or a hydrogenated product thereof. The publication discloses that the composition is suitable to insulators for conductors and soldering wires, and that a thermoplastic polyurethane is used as one of the thermoplastic resins described above. However, since the styrene-conjugated diene block copolymer, which may be hydrogenated, and the thermoplastic polyurethane is poor in compatibility, the properties of each polymer fail to be provided sufficiently, and a useful polymer composition cannot be obtained.

Further, various proposals have been made so far for the techniques with an aim of improving the melt-adhesiveness of the styrene-conjugated diene block copolymer or the hydrogenated product thereof. For example, a melt-adhesive composition comprising a styrene-conjugated diene block copolymer, which may be hydrogenated, and a thermoplastic polyurethane has been known [see the U.S. Pat. No. 5,472,782 and the Japanese Patent Application Laid-open No. Hei 8-72204]. However, this melt-adhesive composition sometimes results in a problem of failing to give a sufficient bonding strength or the lack of the durability of a bonding strength depending on the kind of the material laminated therewith. Moreover, the compatibility between the styrene-conjugated diene block copolymer, which may be hydrogenated, and the thermoplastic polyurethane in this melt-adhesive composition is not quite satisfactory, so that the composition has a problem such as delamination or instability of the bonding strength in the laminate structure obtained, for example, by composite injection molding.

Also, a polymer composition comprising a thermoplastic polyurethane and a styrene-conjugated diene block copolymer, which may be hydrogenated, modified with hydroxyl group, carboxyl group or a derivative thereof has been proposed with an aim of improving the compatibility between the styrene-conjugated diene block copolymer, which may be hydrogenated, and the thermoplastic polyurethane [see the U.S. Pat. No. 5,115,035 and the Japanese Patent Application Laid-open No. Hei 3-234755]. Further, there has been proposed addition of a phosphorus compound or a phenolic compound to the above-described composition to improve the thermal stability during processing [see the Japanese Patent Application Laid-Open No. Hei 7-126474]. However, a satisfactory result has not yet been obtained, because these compositions are still poor in non-tackiness, melt-moldability such as melt-retention stability, and melt-adhesiveness to other resins upon lamination.

As a polymer composition which can solve the above-described problems, the U.S. Pat. No. 6,106,952 discloses the polymer composition comprising (1) a block copolymer, which may be hydrogenated, of an aromatic vinyl compound and a conjugated diene, (2) a block copolymer having a polymer block (I) of a block copolymer, which may be hydrogenated, of an aromatic vinyl compound and a conjugated diene, and a polymer block (II) of a polyurethane, (3) a thermoplastic polyurethane and (4) a paraffin oil.

DISCLOSURE OF THE INVENTION

In recent years, the field in which various elastomers such as a styrene-conjugated diene block copolymer are applied has been extended. Therefore, elastomers having improved properties have been required.

The present invention is made to meet such a requirement. Namely, the object of the present invention is to provide a novel thermoplastic polymer composition having excellent properties such as non-tackiness, melt-moldability such as melt-retention stability, and melt-adhesiveness to other resins upon lamination.

The present inventor have studied on the polymer composition described in the U.S. Pat. No. 6,106,952 and found that the block copolymer ["a block copolymer (2)"], which is known as a component of the polymer composition of the U.S. Pat. No. 6,106,952, may have excellent properties such as non-tackiness, melt-moldability and melt-adhesiveness to other resins upon lamination. In addition, the present inventor also made studies on the production process of said block copolymer and found that the use of a specific compound in that production process can give a block copolymer having improved properties. The present invention was completed based on such findings and additional further studies.

Thus, the present invention provides a thermoplastic polymer composition comprising (a) a block copolymer having a polymer block (I) of a block copolymer, which may be hydrogenated, of an aromatic vinyl compound polymer block and a conjugated diene polymer block, and a polymer block (II) of a polyurethane formed of a high polymer polyol, a chain extender and an organic diisocyanate; (b) at least one compound selected from organic tin compounds, organic titanium compounds and tertiary amines [hereinafter referred to as "compound (b)"]; and (c) a phosphorus compound and/or a phenolic compound [hereinafter referred to as "compound (c)"] and satisfying the following conditions (A) to (E):

(A): The high polymer polyol has a number average molecular weight of 500 to 10,000;

(B): The content of nitrogen derived from the organic diisocyanate in the polymer block (II) is within the range of 1 to 6.5% by weight based on the total weight of the high polymer polyol, the chain extender and the organic diisocyanate;

(C): The content of the compound (b) is from 0.1 ppm to 0.2% by weight based on the block copolymer (a);

(D): The content of the compound (c) is from 1 ppm to 2% by weight based on the block copolymer (a); and (E): The melt-viscosity of the thermoplastic polymer composition meets the following equation (I):

$$0.9 \leq \eta a_2/\eta a_1 \leq 1.4 \quad (I)$$

; wherein $\eta a_1$ means a melt-viscosity of the thermoplastic polymer composition when the urethane bond contained therein reaches to dissociation equilibrium at 200° C. under the load of 490.3 N [50 kgf], and $\eta a_2$ means a melt-viscosity of the thermoplastic polymer composition when kept at 200° C. under the load of 490.3 N [50 kgf] for 60 minutes.

According to the description of the U.S. Pat. No. 6,106,952, a block copolymer used as a component (2) is considered to be a compatibilizing agent between (1) a block copolymer, which may be hydrogenated, of an aromatic vinyl compound and a conjugated diene and (3) a thermoplastic polyurethane. Also, in the above patent, it is described that the block copolymer used as the component (2) can be obtained, for example, (A) by subjecting a thermoplastic polyurethane and a block copolymer, which may be hydrogenated, having an aromatic vinyl compound polymer block and a conjugated diene polymer block and having a functional group, preferably, hydroxyl groups, at the terminal of the molecule to melt kneading to give a reaction mixture, and extracting/recovering the same, or (B) by adding a block copolymer, which may be hydrogenated, having an aromatic vinyl compound polymer block and a conjugated diene polymer block and having a functional group, preferably, hydroxyl groups, at the terminal of the molecule to an extruder and the like at the start or in the course of the thermoplastic polyurethane forming reaction of a high polymer diol, an organic diisocyanate and a chain extender to give a reaction mixture, and extracting/recovering the same.

The afore-mentioned findings by the present inventor are not anticipated by the disclosure of the U.S. Pat. No. 6,106,952.

BEST MODE FOR CARRYING OUT THE INVENTION

The block copolymer (a) is a block copolymer having a polymer block (I) of a block copolymer, which may be hydrogenated, of an aromatic vinyl compound polymer block and a conjugated diene polymer block, and a polymer block (II) of a polyurethane.

In the block copolymer (a), the bonding form of the polymer block (I) and the polymer block (II) may be linear, branched, radial or mixed type thereof. Preferably, the polymer block (I) and the polymer block (II) are bonded in linear form.

The block copolymer (a) may have various structures such as α-β, α-β-α and β-α-β, wherein α means the polymer block (I) and β means the polymer block (II). The di-block structure of α-β is preferred. By using the block copolymer (a) having a di-block structure, a thermoplastic polymer composition having more excellent properties such as non-tackiness, melt-moldability and melt-adhesiveness can be obtained.

When the block copolymer (a) has two or more of the polymer blocks (I), each polymer block (I) may be the same or different. On the other hand, when the block copolymer (a) has two or more of the polymer blocks (II), each polymer block (II) may be the same or different. For example, the two polymer blocks (I) in the tri-block copolymer having the structure of α-β-α, or the two polymer blocks (II) in the tri-block copolymer having the structure of β-α-β may be the same or different in the species or the bonding forms of the structural unit, their number average molecular weight, and so on.

In the block copolymer (a), the weight ratio of the polymer block (I) based on the polymer block (II) falls preferably between 95/5 and 10/90, more preferably between 90/10 and 10/90, still more preferably between 80/20 and 20/80, and the most preferably between 70/30 and 30/70, from the viewpoint of the properties of the resulting thermoplastic polymer composition such as non-tackiness, melt-moldability and melt-adhesiveness.

The aromatic vinyl compound which constitutes the aromatic vinyl compound polymer block in the polymer block (I) can include, for example, styrene, α-methylstyrene, β-methylstyrene, o-methylstyrene, m-methylstyrene, p-methylstyrene, 2,4-dimethylstyrene, 2,4,6-trimethylstyrene, 4-propylstyrene, t-butylstyrene, 4-cyclohexylstyrene, 4-dodecylstyrene, 2-ethyl-4-benzylstyrene, 4-(phenylbutyl) styrene, 1-vinylnaphthalene, vinylanthracene, indene, acetonaphthylene, monofluorostyrene, difluorostyrene, monochlorostyrene and methoxystyrene. The aromatic vinyl compound polymer block may have a structural unit comprising only one aromatic vinyl compound, or may have a structural unit comprising two or more of the aromatic vinyl compounds. Among them, it is preferred that the aromatic vinyl compound polymer block mainly comprises structural units derived from styrene and/or α-methylstyrene.

The aromatic vinyl compound polymer block can optionally have a slight amount of structural units comprising other copolymerizable monomers in addition to the structural units comprising aromatic vinyl compounds. The ratio of the structural units comprising other copolymerizable monomers in this case is preferably 30% by weight or less, and more preferably 10% by weight or less, based on the weight of the aromatic vinyl compound polymer block. The other copolymerizable monomers in this case can include, for example, 1-butene, pentene, hexene, butadiene, 2-methyl-1,3-butadiene [namely, isoprene] and methyl vinyl ether.

The conjugated diene which constitutes the conjugated diene polymer block in the polymer block (I) can include, for example, 1,3-butadiene, 2-methyl-1,3-butadiene [namely, isoprene], 2,3-dimethyl-1,3-butadiene, 1,3-pentadiene and 1,3-hexadiene. The conjugated diene polymer block may have a structural unit comprising only one conjugated diene, or may have a structural unit comprising two or more of the conjugated dienes. When the conjugated diene polymer block has a structural unit derived from two or more of the conjugated dienes, their bonding forms may be a random, tapered, partially block form, or combination of two or more of the forms.

In the polymer block (I), the conjugated diene polymer block may be hydrogenated partially or entirely. In this case, the hydrogenation ratio of the conjugated diene polymer block is in the range of preferably 50 mol % or more, more preferably 60 mol % or more, and still more preferably 80 mol % or more, from the viewpoint of the heat resistance, the weatherability and the light resistance.

From the viewpoint of the melt-moldability of the resulting thermoplastic polymer composition, the conjugated diene polymer block in the polymer block (I) is preferably at least one of the polymer block selected from the group consisting of a polyisoprene which may be hydrogenated, a polybutadiene which may be hydrogenated and a copolymer of isoprene and butadiene which may be hydrogenated.

When the conjugated diene polymer block in the polymer block (I) is a polyisoprene which may be hydrogenated, or a copolymer of isoprene and butadiene which may be hydrogenated and contains 1,2-bond and 3,4-bond in the range of 30 mol % or more, preferably 40 mol % or more, it is possible to obtain an excellent thermoplastic polymer composition in melt-moldability and vibration damping property, and having a large loss tangent value at about ordinary temperature and maintaining a large loss tangent value over a broad temperature range.

In addition, when the conjugated diene polymer block in the polymer block (I) is a polybutadiene which may be hydrogenated and contains 1,2-bond in the range of 60 mol % or more, preferably 80 mol % or more, it is possible to obtain an excellent thermoplastic polymer composition in melt-moldability and vibration damping property, and having a large loss tangent value at about ordinary temperature and maintaining a large loss tangent value over a broad temperature range.

In the polymer block (I), the bonding form of the aromatic vinyl compound polymer block and the conjugated diene polymer block may be linear, branched, radial or mixed type thereof. Preferably, they are bonded in linear form.

The polymer block (I) may have various structures such as $(X-Y)_m-X$, $(X-Y)_n$ and $Y-(X-Y)_p$, wherein X means the aromatic vinyl compound polymer block; Y means the conjugated diene polymer block; and "m", "n" and "p" mean an integer of one or more, respectively. Among them, the polymer block (I) has preferably a structure in which two or more of the aromatic vinyl compound polymer blocks [X] and one or more of the conjugated diene polymer blocks [Y] are bonded in linear form, and has more preferably the tri-block structure of X—Y—X, because a thermoplastic polymer composition having excellent properties such as non-tackiness, melt-moldability and melt-adhesiveness can be obtained with reliability.

When the polymer block (I) has two or more of the aromatic vinyl compound polymer blocks [X], each polymer block [X] may be the same or different. On the other hand, when the polymer block (I) has two or more of the conjugated diene polymer blocks [Y], each polymer block [Y] may be the same or different. For example, the two polymer blocks [X] in the tri-block structure of X—Y—X, or the two polymer blocks [Y] in the tri-block structure of Y—X—Y may be the same or different in the species or the bonding forms of the aromatic vinyl compound or the conjugated diene, their number average molecular weight, and so on.

In the polymer block (I), the content of the structural unit derived from the aromatic vinyl compound is preferably from 5 to 90% by weight based on the total structural unit of the polymer block (I). By using the block copolymer (a) having a polymer block (I) in which the content of the structural unit derived from the aromatic vinyl compound falls within the above-described range, a thermoplastic polymer composition having excellent properties such as non-tackiness, melt-moldability and melt-adhesiveness can be obtained. The polymer block (I) contains, more preferably, the structural unit derived from the aromatic vinyl compound in the range of 10 to 90% by weight based on the total structural unit thereof.

When a thermoplastic polymer composition having high bonding strength to an olefin-based polymer is required, the polymer block (I) contains the structural unit derived from the aromatic vinyl compound in the range of preferably 5 to 60%, more preferably 10 to 50%, by weight based on the total structural unit thereof. On the other hand, when a thermoplastic polymer composition having high bonding strength to a styrene-based polymer is required, the polymer block (I) contains the structural unit derived from the aromatic vinyl compound in the range of preferably 40 to 90%, more preferably 50 to 90%, by weight based on the total structural unit thereof.

In addition, in the polymer block (I), the number average molecular weight of the aromatic vinyl compound polymer block and that of the conjugated diene polymer block are not particularly limited, but the number average molecular weight of the aromatic vinyl compound polymer block preferably ranges from 2,500 to 75,000, and the number average molecular weight of the conjugated diene polymer block preferably ranges from 10,000 to 150,000, before the hydrogenation. By using the block copolymer (a) having a polymer block (I) in which the number average molecular weight of the aromatic vinyl compound polymer block or that of the conjugated diene polymer block falls within the above-described range, a thermoplastic polymer composition having excellent properties such as non-tackiness, melt-moldability and melt-adhesiveness can be obtained.

The number average molecular weight of the polymer block (I) is preferably in the range of 10,000 to 300,000. By using the block copolymer (a) having a polymer block (I) in which the number average molecular weight falls within the above-described range, a thermoplastic polymer composition having excellent properties such as non-tackiness, melt-moldability and melt-adhesiveness can be obtained. The polymer block (I) has, more preferably, the number average molecular weight of 20,000 to 100,000.

The polymer block (II) of the block copolymer (a) is a polymer block of a polyurethane which is made of a high polymer polyol, a chain extender and an organic diisocyanate.

The high polymer polyol which constitutes the polymer block (II) can include, for example, polyester polyols, polyether polyols, polycarbonate polyols, polyester-polycarbonate polyols, polyolefin polyols, conjugated diene polymer based polyols, castor oil based polyols, silicone based polyols and vinyl polymer based polyols. One or more of these high polymer polyols can be used. Among them, the preferred high polymer polyol is at least one of the high polymer polyols selected from the group consisting of polyester polyols, polyether polyols and polyolefin polyols. The more preferred high polymer polyol is polyester polyols and/or polyether polyols.

The polyester polyols can be prepared, for example, by subjecting a polyol component and a polycarboxylic acid component to the esterification reaction or the ester exchange reaction, or by subjecting a lactone to a ring-opening polymerization under the presence of a polyol component.

The polyol components used for the preparation of the polyester polyols can include ones conventionally used for the preparation of an ester, for example, aliphatic diols having 2 to 15 carbon atoms such as ethylene glycol, diethylene glycol, triethylene glycol, propylene glycol, 1,3-propanediol, 2-methyl-1,3-propanediol, 2,2-diethyl-1,3-propanediol, 1,3-butanediol, 1,4-butanediol, 2-methyl-1,4-butanediol, neopentyl glycol, 1,5-pentanediol, 3-methyl-1,5-pentanediol, 1,6-hexanediol, 1,7-heptanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol and 1,10-decanediol; cycloaliphatic diols such as 1,4-cyclohexanediol, cyclohexanedimethanol and cyclooctanedimethanol; aromatic diols such as 1,4-bis(β-hydroxyethoxy)benzene; and polyhydric alcohols having not less than three hydroxyl groups such as trimethylolpropane, trimethylolethane, glycerin, 1,2,6-hexanetriol, pentaerythritol and diglycerol. One or more of these compounds can be used as a polyol component for the preparation of the polyester polyol.

Among them, for the preparation of the polyester polyol, the preferred polyol component is an aliphatic diol having 5 to 12 carbon atoms and a methyl group as a side chain such as 2-methyl-1,4-butanediol, 3-methyl-1,5-pentanediol; 2-methyl-1,8-octanediol, 2,7-dimethyl-1,8-octanediol, 2-methyl-1,9-nonanediol or 2,8-dimethyl-1,9-nonanediol. Especially, such an aliphatic diol having 5 to 12 carbon atoms and a methyl group as a side chain is used in the range of preferably 30 mol % or more, more preferably 50 mol % or more, based on the total polyol component used for the preparation of the polyester polyol.

The polycarboxylic acid components used for the preparation of the polyester polyols can include ones conventionally used for the preparation of an ester, for example, aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, 3-methylglutaric acid, trimethyladipic acid, 2-methyloctanedicarboxylic acid, 3,8-dimethyldecanedicarboxylic acid and 3,7-dimethyldecanedicarboxylic acid; cycloaliphatic dicarboxylic acids such as cyclohexanedicarboxylic acid, dimer acid and hydrogenated product of dimer acid; aromatic dicarboxylic acids such as terephthalic acid, isophthalic acid, orthophthalic acid and naphthalenedicarboxylic acid; polycarboxylic acids such as trimellitic acid and pyromellitic acid; and derivatives thereof which can form esters, such as carboxylic acid esters and carboxylic anhydrides. One or more of these compounds can be used as the polycarboxylic acid component. Among them, the preferred polycarboxylic acid component is an aliphatic dicarboxylic acid having 2 to 6 carbon atoms, and the more preferred polycarboxylic acid component is at least one compound selected from the group consisting of adipic acid, azelaic acid and sebacic acid.

The lactones used for the preparation of the polyester polyols can include, for example, ε-caprolactone and β-methyl-δ-valerolactone.

The polyether polyols can include, for example, ones prepared by the ring-opening polymerization of a cyclic ether such as a polyethylene glycol, a polypropylene glycol, a polytetramethylene ether glycol or a poly(methyltetramethylene ether)glycol. One or more of these polyether polyols can be used. Among them, the preferred polyether polyol is a polytetramethylene ether glycol and/or a poly(methyltetramethylene ether)glycol.

The polycarbonate polyols can include, for example, those obtained by the reaction of a polyol component and a carbonate compound such as a dialkyl carbonate, an alkylene carbonate or a diaryl carbonate.

The polyol component, which constitutes the polycarbonate polyols, can include ones exemplified above as a polyol component constituting the polyester polyols. The dialkyl carbonate can include, for example, dimethyl carbonate and diethyl carbonate. Examples of the alkylene carbonate can include ethylene carbonate; and examples of the diaryl carbonates can include diphenyl carbonate.

The polyester-polycarbonate polyols can include, for example, those obtained by the reaction of a polyol component, a polycarboxylic acid component and a carbonate compound; those obtained by the reaction of a carbonate compound and a previously prepared polyester polyol and polycarbonate polyol; and those obtained by the reaction of a previously prepared polyester polyol and polycarbonate polyol, a polyol component and a polycarboxylic acid component.

The conjugated diene polymer based polyols, or the polyolefin polyols can include a polyisoprene polyol, a polybutadiene polyol, a poly(butadiene/isoprene)polyol, a poly(butadiene/acrylonitrile)polyol, a poly(butadiene/styrene)polyol, and a hydrogenated product thereof, prepared by polymerizing a conjugated diene such as butadiene or isoprene, or a conjugated diene and another monomer, by a living polymerization method, or the like in the presence of a polymerization initiator, followed by the reaction with an epoxy compound. One or more of these conjugated diene polymer based polyols, or the polyolefin polyols can be used.

The number average molecular weight of the high polymer polyol should fall within the range of 500 to 10,000. By using the block copolymer (a) having a polymer block (II) made of the high polymer polyol with such a number average molecular weight, a thermoplastic polymer composition having excellent properties such as non-tackiness, melt-moldability and melt-adhesiveness can be obtained with reliability. The number average molecular weight of the high polymer polyol is in the range of preferably 700 to 8,000, and more preferably 800 to 5,000. Here, the number average molecular weight of the high polymer polyol referred to in this specification means the number average molecular weight based on its hydroxyl value as measured in accordance with JIS K-1577.

The chain extender which constitutes the polymer block (II) can include ones conventionally used for the preparation of a polyurethane. The preferred chain extender is a compound having a molecular weight of not more than 400 and having two or more active hydrogen atoms capable of reacting with isocyanate group.

The chain extender can include, for example, diols such as ethylene glycol, propylene glycol, 1,4-butanediol, 1,6-hexanediol, 2-methyl-1,3-propanediol, 2,2-diethyl-1,3-propanediol, 2-butyl-2-ethyl-1,3-propanediol, 2-methyl-1,4-butanediol, neopentyl glycol, 3-methyl-1,5-pentanediol, 2,4-diethyl-1,5-pentanediol, 2-ethyl-1,3-hexanediol, 2-methyl-1,8-octanediol, 2,7-dimethyl-1,8-octanediol, 2-methyl-1,9-nonanediol, 2,8-dimethyl-1,9-nonanediol, 1,4-bis(β-hydroxyethoxy)benzene, 1,4-cyclohexanediol, bis(β-hydroxyethyl)terephthalate, xylylene glycol, 1,4-cyclohexanedimethanol, 1,4- or 1,5-cyclooctanedimethanol, 3 (or 4), 8 (or 9)-dihydroxymethyltricyclo[5.2.1.0$^{2,6}$]decane; diamines such as hydrazine, ethylenediamine, propylenediamine, xylylenediamine, isophorone diamine, piperazine, piperazine derivatives, phenylenediamine, toluylenediamine, adipic acid dihydrazide and isophthalic acid dihydrazide; aminoalcohols such as aminoethyl alcohol and aminopropyl alcohol; and so on. One or more of these chain extenders can be used. Among them, the preferred chain extender is an aliphatic diol having 2 to 12 carbon atoms, and the more preferred chain extender is 1,4-butanediol, 3-methyl-1,5-pentanediol, 2-methyl-1,8-octanediol or 1,9-nonanediol.

In addition, by using a branched aliphatic diol having a number average molecular weight of 100 to 400 as a chain extender, a thermoplastic polymer composition having excellent vibration damping properties which show large loss tangent value at about ordinary temperature and maintain large loss tangent value over a broad temperature range can be obtained. The preferred branched aliphatic diol is the one having 5 to 12 carbon atoms and a methyl group as a side chain.

The organic diisocyanate which constitutes the polymer block (II) can include ones conventionally used for the preparation of a polyurethane. Examples of the organic diisocyanate include aromatic diisocyanates such as 4,4'-diphenylmethane diisocyanate, tolylene diisocyanate, phenylene diisocyanate, xylylene diisocyanate, 1,5-naphthylene diisocyanate and 3,3'-dichloro-4,4'-diphenylmethane diisocyanate; aliphatic or alicyclic diisocyanates such as hexamethylene diisocyanate, isophorone diisocyanate, 4,4'-methylenebis(cyclohexyl isocyanate) and hydrogenated xylylene diisocyanate; and so on. One or more of these organic diisocyanates can be used. Among them, the preferred organic diisocyanate is 4,4'-diphenylmethane diisocyanate.

The amount of the high polymer polyol, the chain extender and the organic diisocyanate which constitutes the polymer block (II) should be adjusted such that the content of nitrogen derived from the organic diisocyanate is in the range of 1 to 6.5% by weight based on the total weight of the high polymer polyol, the chain extender and the organic diisocyanate. When the high polymer polyol, the chain extender and the organic diisocyanate are used in amount that the content of nitrogen derived from the organic diisocyanate is set within the above-described range, a thermoplastic polymer composition having excellent properties such as non-tackiness, melt-moldability and melt-adhesiveness can be obtained. In the polymer block (II), the content of nitrogen derived from the organic diisocyanate falls preferably between 1 and 6% by weight, more preferably between 1.3 and 5.5% by weight, and still more preferably between 1.6 and 5% by weight, based on the total weight of the high polymer polyol, the chain extender and the organic diisocyanate.

The number average molecular weight of the polymer block (II) falls preferably between 200 and 300,000. By using the block copolymer (a) having a polymer block (II) with such a number average molecular weight, a thermoplastic polymer composition having excellent properties such as non-tackiness, melt-moldability and melt-adhesiveness can be obtained. The number average molecular weight of the polymer block (II) is in the range of preferably 500 to 150,000, and more preferably 1,000 to 100,000.

The block copolymer (a) can be obtained, for example, by effecting a polyurethane forming reaction under the presence of a block copolymer, which may be referred to as "functionality block copolymer" hereinafter, having a structure corresponding to the polymer block (I) and a functional group reactive with a component of the polymer block (II). That is, the block copolymer (a) can be obtained by forming the polymer block (II) of a polyurethane on the polymer chain of a block copolymer, which may be hydrogenated, having an aromatic vinyl compound polymer block and a conjugated diene polymer block, and having a functional group reactive with a component such as an organic diisocyanate, a chain extender or a high polymer polyol. In addition, the block copolymer (a) can also be obtained by subjecting a functionality block copolymer and a polyurethane having a structure corresponding to the polymer block (II).

Examples of the functional group which is contained in the functionality block copolymer and which is reactive with a component of the polymer block (II) can include ones reactive with a high polymer polyol and/or a chain extender, such as carboxyl group, acid anhydride group, thiocarboxyl group, isocyanate group, and so on; and ones reactive with an organic diisocyanate, such as hydroxyl group; amino group, mercapto group, carboxyl group, acid anhydride group, thiocarboxyl group, isocyanate group, and so on. The functionality block copolymer can contain one or more of these functional groups.

The functionality block copolymer has preferably a functional group-reactive with an organic diisocyanate. The more preferred functional group is hydroxyl group, because a homogeneous polyurethane forming reaction can be conducted upon the preparation of the block copolymer (a).

The functional group reactive with a component of the polymer block (II) can locate preferably on a terminal of the functionality block copolymer. When a functionality block copolymer having such a functional group on a terminal of the molecule is used, the functional group can participate in the extension of main chain structure by polyurethane forming reaction upon the preparation of the block copolymer (a). By using the block copolymer (a) thus obtained, a thermoplastic polymer composition having excellent properties such as non-tackiness, melt-moldability and melt-adhesiveness can be obtained with reliability.

The average number of the functional group reactive with a component of the polymer block (II) is preferably not less than 0.6, and more preferably not less than 0.7, per a molecule of the functionality block copolymer.

The functionality block copolymer can be prepared by an ionic polymerization such as an anionic polymerization or a cationic polymerization; a single site polymerization, a radical polymerization or the like. For example, the functionality block copolymer can be prepared by the procedures, in which an anionic polymerization is employed, comprising successively polymerizing an aromatic vinyl compound and a conjugated diene in an inert organic solvent such as n-hexane or cyclohexane using an alkyllithium compound as a polymerization initiator, adding a compound having an oxirane skeleton such as ethylene oxide, propylene oxide or styrene oxide; or a lactone such as ε-caprolactone, β-propiolactone, dimethylpropiolactone [pivalolactone] or methylvalerolactone when the desired molecular structure and the desired molecular weight are obtained, and then adding an active hydrogen-containing compound such as alcohols, carboxylic acids or water to terminate the polymerization. Then the obtained functionality block copolymer is preferably hydrogenated in an inert organic solvent such as n-hexane or cyclohexane under the presence of a hydrogenation catalyst such as a Ziegler catalyst consisting an alkylaluminum compound and cobalt or nickel at a reaction temperature of 20 to 150° C. and at a hydrogen pressure of 1 to 150 kg/cm$^2$. In addition, the functionality block copolymer, before or after hydrogenation, may be optionally modified with maleic anhydride, and so on. The functionality block copolymer and/or the hydrogenated product thereof may contain, depending on the preparation method thereof, a block copolymer having an aromatic vinyl compound polymer block, a conjugated diene polymer block and no functional group.

As the functionality block copolymer, commercially available ones can be used.

The number average molecular weight of the functionality block copolymer is in the range of preferably 15,000 to 300,000, and more preferably 20,000 to 100,000. Here, the number average molecular weight of the functionality block copolymer is a value obtained by gel permeation chromatography [GPC], based on the standard polystyrene calibration curve.

The MFR [melt flow rate] value of the functionality block copolymer, when measured at 230° C. under the load of 2.16 kg, falls preferably between 0.01 and 100 g/10 minutes. By using a functionality block copolymer having such an MFR value, a thermoplastic polymer composition having excellent properties such as non-tackiness, melt-moldability and melt-adhesiveness can be obtained. The MFR [melt flow rate] value of the functionality block copolymer, when measured at 230° C. under the load of 2.16 kg, falls more preferably between 0.05 and 80 g/10 minutes. Here, the MFR value of the functionality block copolymer is measured in accordance with ASTM D-1238.

The polymer block (II) or a polyurethane corresponding to the polymer block (II) can be formed with the above-described high polymer polyol, the chain extender and the organic diisocyanate by a conventional polyurethane forming reaction.

In the formation of the polymer block (II) or a polyurethane corresponding to the polymer block (II), each component is employed preferably in amount such that the isocyanate group of the organic diisocyanate is present by a ratio of 0.9 to 1.3 moles per 1 mole of the total active hydrogen atoms of the high polymer polyol and the chain extender. By using a block copolymer having the polymer block (II) prepared by a high polymer polyol, a chain extender and an organic diisocyanate with above-described ratio, a thermoplastic polymer composition having excellent properties such as non-tackiness, melt-moldability and melt-adhesiveness can be obtained.

Also, in the formation of the polymer block (II) and a polyurethane corresponding to the polymer block (II), it is preferable to use each component in amount such that the content of nitrogen derived from the organic diisocyanate is in the range of 1 to 6.5% by weight based on the total weight of the high polymer polyol, the chain extender and the organic diisocyanate.

By using a block copolymer (a) having the polymer block (II) formed of a high polymer polyol, a chain extender and an organic diisocyanate in the above-described ratio, a thermoplastic polymer composition having excellent properties such as non-tackiness, melt-moldability and melt-adhesiveness can be obtained. The each component is used in amount such that the content of nitrogen derived from the organic diisocyanate falls preferably between 1 and 6% by weight, more preferably between 1.3 and 5.5% by weight, and still more preferably between 1.6 and 5% by weight, based on the total weight of the high polymer polyol, the chain extender and the organic diisocyanate.

The block copolymer (a) can be easily and preferably prepared by (A) the reaction of a functionality block copolymer, a high polymer polyol, a chain extender and an organic diisocyanate, or (B) the reaction between a functionality block copolymer and a reaction product of a high polymer polyol, a chain extender and an organic diisocyanate.

With respect to the reaction (B), the reaction product can include a reaction mixture of a high polymer polyol, a chain extender and an organic diisocyanate, which may be further subjected to work up with the conventional process. Also, commercially available polyurethanes may be used as the reaction product so long as they are prepared from a high polymer polyol, a chain extender and an organic diisocyanate.

The reaction product of a high polymer polyol, a chain extender and an organic diisocyanate can contain, in addition to polyurethane produced therefrom, the unreacted high polymer polyol, the unreacted chain extender and the unreacted organic diisocyanate according to the amounts of the reactants, degree of conversion, other reaction conditions, and so on. In this case, the reaction between a functionality block copolymer and a polyurethane produced from a high polymer polyol, a chain extender and an organic diisocyanate, and the reaction between a functionality block copolymer, a high polymer polyol, a chain extender and an organic diisocyanate proceed simultaneously.

When the block copolymer (a) is produced by the reaction (A), the weight ratio of a functionality block copolymer based on the sum of a high polymer polyol, a chain extender and an organic diisocyanate ([the weight of a functionality block copolymer]: [the total weight of a high polymer polyol, a chain extender and an organic diisocyanate]) is in the range of preferably 10:90 to 90:10, more preferably 20:80 to 80:20, and still more preferably 30:70 to 70:30.

Also, when the block copolymer (a) is produced by the reaction (B), the weight ratio of a functionality block copolymer based on a reaction product of a high polymer polyol, a chain extender and an organic diisocyanate ([the weight of a functionality block copolymer]: [the weight of a reaction product of a high polymer polyol, a chain extender and an organic diisocyanate]) is in the range of preferably 10:90 to 90:10, more preferably 20:80 to 80:20, and still more preferably 30:70 to 70:30.

The block copolymer (a) thus prepared may contain a polyurethane formed by the high polymer polyol, the chain extender and the organic diisocyanate. Also, the block copolymer (a) may contain a block copolymer, which may be hydrogenated, having an aromatic vinyl compound polymer block and a conjugated diene polymer block, and having a functional group on a terminal of the molecule. In addition, the block copolymer (a) can contain, depending on the preparation method thereof, a block copolymer having an aromatic vinyl compound polymer block, a conjugated diene polymer block and no functional group.

The block copolymer (a) can be obtained, for example, by the procedures of (i) subjecting the composition prepared by the reaction (A) or (B), which may be optionally pelletized and pulverized into appropriate size, to the treatment with a good solvent for polyurethane such as dimethylformamide in order to remove the polyurethane unreacted with the functionality block copolymer, and the treatment with a good solvent for functionality block copolymer such as cyclohexane in order to remove the unreacted functionality block copolymer and a block copolymer corresponding to the polymer block (I), successively, and (ii) drying the remaining solid material.

According to the present invention, it is also possible to use the composition prepared by the reaction (A) or (B) as it is, as long as it does not depart from the scope of the invention. Therefore, the thermoplastic polymer composition according to the present invention may contain the above-described polymers or the same type of the above-described polymers in addition to the block copolymer (a). Thus, the thermoplastic polymer composition according to the present invention may contain a thermoplastic polyurethane. As the thermoplastic polyurethane, there can be used those prepared from the reaction of a high polymer polyol, a chain extender and an organic diisocyanate, which is not limited to the polyurethane produced upon the preparation of the block copolymer (a).

The amount of a thermoplastic polyurethane falls preferably between 0 and 1,000 parts by weight, more preferably between 0 and 500 parts by weight, and still more preferably between 0 and 300 parts by weight, based on 100 parts by weight of the block copolymer (a).

In addition, the thermoplastic polymer composition according to the present invention can contain a block copolymer having an aromatic vinyl compound polymer block, a conjugated diene polymer block and no functional group. Such a block copolymer is not limited to ones that is contained in the functionality block copolymer, and can include a so-called styrene-based elastomer.

The amount of a block copolymer having an aromatic vinyl compound polymer block, a conjugated diene polymer block and no functional group falls preferably between 0 and 500 parts by weight, and more preferably between 0 and 300 parts by weight, based on 100 parts by weight of the block copolymer (a).

The thermoplastic polymer composition according to the present invention contains the above-described block copolymer (a) and at least one of the compound (b) selected from the group consisting of organic tin compounds, organic titanium compounds and tertiary amines. The compound (b) is commonly known as a catalyst of polyurethane forming reaction. Among them, one or more of the organic tin compounds and the organic titanium compounds are preferably used. The more preferred compound is the organic tin compound.

The organic tin compound can include, for example, tin carboxylates and tin mercaptocarboxylates, such as tin octylate, monomethyltin mercaptoacetate, monobutyltin triacetate, monobutyltin monooctylate, monobutyltin monoacetate, monobutyltin maleate, monobutyltin benzyl maleate, monooctyltin maleate, monooctyltin thiodipropionate, monooctyltin tris(isooctyl thioglycolate), monophenyltin triacetate, dimethyltin maleate, dimethyltin bis(ethylene glycol monothioglycolate), dimethyltin bis(mercaptoacetate), dimethyltin bis(3-mercaptopropionate), dimethyltin bis(isooctyl mercaptoacetate), dibutyltin diacetate, dibutyltin dioctanoate, dibutyltin distearate, dibutyltin dilaurate, dibutyltin maleate, dibutyltin maleate polymers, dibutyltin maleate esters, dibutyltin bis(mercaptoacetate), dibutyltin bis(alkyl mercaptoacetates), dibutyltin bis(alkoxybutyl 3-mercaptopropionates), dibutyltin bis(octylthioglycol esters), dibutyltin bis(3-mercaptopropionate), dioctyltin maleate, dioctyltin maleate esters, dioctyltin maleate polymers, dioctyltin dilaurate, dioctyltin bis(isooctyl mercaptoacetate), dioctyltin bis (isooctyl thioglycolate esters), dioctyltin bis(3-mercaptopropionate) and so on. Among them, preferred organic tin compound is dialkyltin diacylates such as dibutyltin diacetate and dibutyltin dilaurate; dialkyltin bis(mercaptocarboxylate esters) such as dibutyltin bis(3-ethoxybutyl 3-mercaptopropionate), and so on.

The organic titanium compound can include, for example, titanic acid; tetraalkoxy titanium compounds such as tetraisopropyl titanate, tetra-n-butyl titanate, tetra-2-ethylhexyl titanate and tetrastearyl titanate; titanium acylates such as polyhydroxytitanium stearate; titanium chelate compounds such as titanium acetylacetonate, triethanolamine titanate, titanium ammonium lactate, titanium ethyl lactate and titanium octylene glycol; and so on.

The tertiary amine can include, for example, cyclic amines such as triethylenediamine, N-methyl-N'-(2-dimethylamino)ethylpiperazine and N-methylmorpholine; triamines such as N,N,N',N'',N''-pentamethyldiethylenetriamine and N,N,N',N'',N''-pentamethyldipropylenetriamine; diamines such as N,N,N',N'-tetramethylethylenediamine, N,N,N',N'-tetramethylpropylenediamine and N,N,N',N'-tetramethylhexamethylenediamine; monoamines such as triethylamine; aminoalcohols such as N,N-dimethylaminoethanol, N,N,N',N'-tetramethyl-1,3-diamino-2-propanol and N-methyl-N'-(2-hydroxyethyl)piperazine.

The amount of the compound (b) falls between 0.1 ppm and 0.2% by weight based on the weight of the block copolymer (a). When the amount of the compound (b) is less than 0.1 ppm based on the weight of the block copolymer (a), it is difficult to produce a thermoplastic polymer composition having excellent properties such as melt-moldability and melt-adhesiveness. On the other hand, when the amount of the compound (b) is more than 0.2% by weight based on the weight of the block copolymer (a), the melt-moldability, especially melt-retention stability, of the resulting thermoplastic polymer composition may be reduced.

The amount of the compound (b) falls preferably between 0.5 ppm and 0.02% by weight, more preferably between 1 ppm and 0.01% by weight, based on the weight of the block copolymer (a).

The thermoplastic polymer composition of the present invention consists a compound (c) selected from phosphorus compounds and/or phenolic compounds. When an organic tin compound or an organic titanium compound is used as the compound (b), a phosphorus compound is preferable as the compound (c). On the other hand, when a tertiary amine is used as the compound (b), a phenolic compound is preferable as the compound (c).

As the phosphorus compound, the preferred compound is ones represented by the formulas (1) to (3).

wherein "a" and "j" each means 0 or 1, $R^1$ to $R^3$ each means hydrogen atom or monovalent hydrocarbon group, and if "a" is 1, at least one of $R^1$ to $R^3$ is an aliphatic hydrocarbon group or a cycloaliphatic hydrocarbon group.

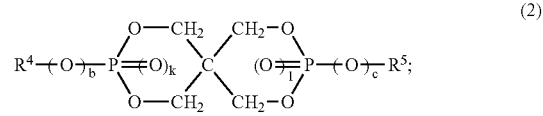

wherein "b", "c", "k" and "l" each means 0 or 1, and $R^4$ and $R^5$ each means monovalent hydrocarbon group.

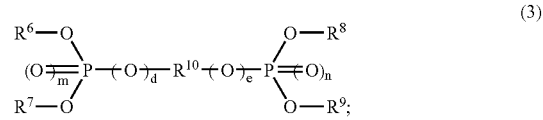

wherein "d", "e", "m" and "n" each means 0 or 1, $R^6$ to $R^9$ each means monovalent hydrocarbon group, $R^{10}$ means divalent hydrocarbon group, and if both "d" and "e" are 1, at least one of $R^6$ to $R^{10}$ is an aliphatic hydrocarbon group or a cycloaliphatic hydrocarbon group.

As the monovalent hydrocarbon group represented by $R^1$ to $R^9$, ones having 1 to 30 carbon atoms are preferable, examples of which include aliphatic hydrocarbon groups such as methyl group, ethyl group, propyl group, butyl group, pentyl group, hexyl group, octyl group, isooctyl group, 2-ethylhexyl group, nonyl group, decyl group, dodecyl group, isodecyl group and octadecyl group; cycloalipahtic hydrocarbon groups such as cyclohexyl group; aromatic hydrocarbon groups such as phenyl group, nonylphenyl group, cresyl group, 2,4-di-tert-butylphenyl group, 2,6-di-tert-butyl-4-methylphenyl group, naphtyl group, benzyl group and 3,5-di-tert-butyl-4-hydroxybenzyl group; and so on. Such aromatic hydrocarbon groups may have, on the aromatic ring, a substituent such as a halogen atom, an alkoxy group, phenoxy group or hydroxyl group.

As the divalent hydrocarbon group represented by $R^{10}$, ones having 1 to 50 carbon atoms are preferable, examples of which include divalent aliphatic hydrocarbon groups such as methylene group, ethylene group, propylene group and butylene group; divalent cycloalipahtic hydrocarbon groups such as cyclohexylene group; divalent aromatic hydrocarbon groups such as phenylene group, biphenylene group, 4,4'-butylidenebis(6-tert-butyl-3-methylphenyl) group and 4,4'-isopropylidenediphenyl group; and so on. Such divalent aromatic hydrocarbon groups may have, on the aromatic ring, a substituent such as a halogen atom, an alkoxy group, phenoxy group or hydroxyl group.

The phosphorus compound represented by the formula (1) can include phosphorous acid, phosphoric acid, phosphorous acid esters such as methyl phosphite, ethyl phosphite, isopropyl phosphite, butyl phosphite, 2-ethylhexyl phosphite, lauryl phosphite, oleyl phosphite, stearyl phosphite, phenyl phosphite, dimethyl phosphite, diethyl phosphite, diisopropyl phosphite, dibutyl phosphite, bis(2-ethylhexyl) phosphite, dilauryl phosphite, dioleyl phosphite, distearyl phosphite, diphenyl phosphite, trimethyl phosphite, triethyl phosphite, tributyl phosphite, trioctyl phosphite, tris(2-ethylhexyl)phosphite, trinonyl phosphite, tris(decyl)phosphite, tris(dodecyl)phosphite, tris(octadecyl)phosphite, tricyclohexyl phosphite, diphenylisooctyl phosphite, phenyldiisooctyl phosphite, diphenylisodecyl phosphite and phenyldiisodecyl phosphite; phosphate esters such as methyl phosphate, ethyl phosphate, isopropyl phosphate, butyl phosphate, 2-ethylhexyl phosphate, lauryl phosphate, oleyl phosphate, stearyl phosphate, phenyl phosphate, dimethyl phosphate, diethyl phosphate, diisopropyl phosphate, dibutyl phosphate, bis(2-ethylhexyl)phosphate, dilauryl phosphate, dioleyl phosphate, distearyl phosphate, diphenyl phosphate, trimethyl phosphate, triethyl phosphate, tributyl phosphate, trioctyl phosphate, tris(2-ethylhexyl)phosphate, tris(decyl) phosphate, tris(dodecyl)phosphate, tris(octadecyl)phosphate and tricyclohexyl phosphate; diesters of a phosphinic acid derivative such as dimethyl phenylphosphonite, diethyl phenylphosphonite, dibutyl phenylphosphonite, dioctyl phenylphosphonite, didodecyl phenylphosphonite, bis(octadecyl)phenylphosphonite, dicyclohexyl phenylphosphonite and diphenyl phenylphosphonite; diesters of a phosphonic acid derivative such as dimethyl phenylphosphonate, diethyl phenylphosphonate, dibutyl phenylphosphonate, dioctyl phenylphosphonate, didodecyl phenylphosphonate, bis(octadecyl)phenylphosphonate, dicyclohexyl phenylphosphonate, diphenyl phenylphosphonate and diethyl 3,5-di-tert-butyl-4-hydroxybenzylphosphonate; and so on.

The phosphorus compound represented by the formula (2) can include phosphorous acid triesters such as didodecyl pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite and bis(2,6-di-tert-butyl-4-methylphenyl)pentaerythritol diphosphite; phosphate triesters such as bis(octadecyl)pentaerythritol diphosphate; and so on.

The phosphorus compound represented by the formula (3) can include phosphorous acid triesters such as 4,4'-butylidenebis(6-tert-butyl-3-methylphenyldodecyl)phosphite and 4,4'-isopropylidenediphenoltetrakis(tridecyl)diphosphite; diesters of a phosphinic acid derivative such as tetrakis(2,4-di-tert-butylphenyl)-4,4'-bi(phenylene phosphonite); and so on.

One or more of these phosphorus compounds can be used.

Among them, the preferred phosphorus compounds are phosphate esters or diesters of phosphonic acid derivatives. The more preferred phosphorus compounds are lauryl phosphate, oleyl phosphate, stearyl phosphate, dilauryl phosphate, dioleyl phosphate, distearyl phosphate, tris(2-ethylhexyl)phosphate, bis(octadecyl)pentaerythritol diphosphate, diethyl phenylphosphonate and diethyl 3,5-di-tert-butyl-4-hydroxybenzylphosphonate.

The phenolic compound can include hindered phenols such as 2,2'-methylenebis(6-tert-butyl-4-methylphenol), 2-butyl-6-(3'-tert-butyl-2'-hydroxy-5'-methylbenzyl)-4-methylphenyl acrylate, 2-[1-(2-hydroxy-3,5-dipentylphenyl)ethyl]-4,6-dipentylpheny 1 acrylate, 4,4'-butylidenebis(6-tert-butyl-3-methylphenol), 4,4'-thiobis(6-tert-butyl-3-methylphenol), 3,9-bis{2-[3-(3-tert-butyl-4-hydroxyphenyl)propionyloxy]-1,1-dimethylethyl}-2,4,8,10-tetraoxaspiro[5.5]undecene, triethylene glycol bis[3-(3-tert-butyl-4-hydroxy-5-methylphenyl)propionate], 1,1,3-tris(5-tert-butyl-4-hydroxy-2-methylphenyl)butane, 1,3,5-(tert-butyl-3-hydroxy-2,6-dimethylbenzyl)-1,3,5-triazine-2,4,6-(1H,3H,5H)trione and 2,2'-methylenebis(6-tert-butyl-4-ethylphenol); hydroxybenzophenones such as 2-hydroxy-4-octylbenzophenone, 2-hydroxy-4-dodecyloxybenzophenone, 2-hydroxy-4-benzyloxybenzophenone and bis(5-benzoyl-4-hydroxy-2-methoxyphenyl)methane; hydroxybenzotriazoles such as 2-[2'-hydroxy-3'-(3'',4'',5'',6''-tetrahydrophthalimidomethyl)-5'-methylphenyl]benzotriazole, 2-(3',5'-di-tert-butyl-2'-hydroxyphenyl)benzotriazole, 2-(2'-hydroxy-5'-tert-octylphenyl)benzotriazole, 2-(3',5'-di-tert-amyl-2'-hydroxyphenyl)benzotriazole, 2-[2-hydroxy-3,5-bis(α,α-dimethylbenzyl)phenyl]-2H-benzotriazole and 2,2'-methylenebis{4-(1,1,3,3-tetramethylbutyl)-6-[(2H-benzotriazole-2-yl)phenol]}; salicylic acid compounds such as 4-tert-butylphenylsalicylic acid; oxybenzoic acid compounds such as phenyl 4-tert-butyl-p-oxybenzoate; catechol compounds such as octyl 3,4-dihydroxybenzoate; resorcinol compounds such as octyl 3,5-dihydroxybenzoate; biphenol compounds such as 4,4'-dioctyl-2,2'-biphenol; binaphthol compounds such as 2,2'-binaphthol.

One or more of these phenolic compounds can be used.

The amount of the compound (c) falls between 1 ppm and 2% by weight based on the weight of the block copolymer (a). When the amount of the compound (c) is less than 1 ppm based on the weight of the block copolymer (a), the melt-moldability, especially melt-retention stability, of the resulting thermoplastic polymer composition may be reduced. On the other hand, when the amount of the compound (c) is more than 2% by weight based on the weight of the block copolymer (a), not only the surface profile of the molded articles made of the resulting thermoplastic polymer composition is injured but also the melt-adhesiveness of the resulting thermoplastic polymer composition may be reduced, especially when used in the preparation of a laminate structure.

The amount of the compound (c) falls preferably between 5 ppm and 0.2% by weight, more preferably between 10 ppm and 0.1% by weight, based on the weight of the block copolymer (a).

When a phosphorus compound is employed as the compound (c), the phosphorus compound is used in amounts such that the phosphorus atom in the phosphorus compound is present in the range of preferably 0.1 to 500 mole, more preferably 0.2 to 200 mole, still more preferably 0.5 to 100 mole, based on 1 mole of a metal atom or nitrogen atom in the compound (b).

On the other hand, when a phenolic compound is employed as the compound (c), the phenolic compound is used in amounts such that the hydroxyl group in the phenolic compound is present in the range of preferably 1 to 5000 mole, more preferably 2 to 2000 mole, and still more preferably 5 to 1000 mole, based on 1 mole of a metal atom or nitrogen atom in the compound (b).

The thermoplastic polymer composition of the present invention can optionally contain a polymer (d) selected from an olefin-based polymer and/or a styrene-based polymer other than the bock copolymer (a), within the extent where effects of the invention is retained. The amount of the polymer (d) is, in general, in the range of 1 to 1000% by weight based on the weight of the block copolymer (a). By blending such a polymer (d), the resulting thermoplastic polymer composition may sometimes show improved properties such as non-tackiness, melt-moldability and melt-adhesiveness.

As the above-mentioned styrene-based polymers, ones having a structural unit derived from a styrene monomer in an amount of 10% by weight or more is preferably used. The more preferred styrene-based polymers are those having a structural unit derived from a styrene monomer in an amount of 50% by weight or more. The styrene monomers can include styrene, α-methylstyrene, p-methylstyrene, p-tert-butylstyrene, 3,4-dimethylstyrene and the like. The styrene-based polymer can contain one or more of the structural unit derived from such a styrene monomer. In addition, the styrene-based polymer may contain a structural unit derived from a vinyl monomer other than the above-mentioned styrene monomer in an amount of not more than 90% by weight, preferably not more than 50% by weight. Examples of the vinyl monomer other than the styrene monomer can include ones having a cyano group such as acrylonitrile and methacrylonitrile; C1–18 alkyl esters of acrylic acid or C1–18 alkyl esters of methacrylic acid such as methyl esters, ethyl esters, propyl esters, n-butyl esters, isobutyl esters, hexyl esters, 2-ethylhexyl esters, dodecyl esters and octadecyl esters; esters of acrylic acid or methacrylic acid and a diol such as ethylene glycol, propylene glycol or butanediol; vinyl esters of a carboxylic acid having 1 to 6 carbon atoms such as acetic acid or propionic acid; unsaturated carboxylic acids such as acrylic acid, methacrylic acid and maleic acid; unsaturated dicarboxylic anhydrides such as maleic anhydride; (meth)acrylamides such as acrylamide, methacrylamide and N,N-dimethylacrylamide; maleimide; N-substituted maleimides such as N-methylmaleimide, N-ethylmaleimide, N-phenylmaleimide and N-cyclohexylmaleimide; conjugated dienes such as butadiene and isoprene; and so on. The styrene-based polymer may contain one or more of the structural unit derived from such a vinyl monomer.

The olefin-based polymer includes homopolymers of an olefin such as ethylene, propylene or butylene; copolymers of two or more of the above-mentioned olefins; and copolymers of one or more of the above-mentioned olefins and one or more of other vinyl monomers. Examples of the olefin-based polymer can include low-density polyethylenes, medium-density polyethylenes, high-density polyethylenes, polypropylenes, polybutylenes, ethylene-vinyl acetate copolymers, ethylene-acrylic acid copolymers, ethylene-maleic anhydride copolymers, ethylene-propylene copolymers, ethylene-propylene-diene terpolymers, ethylene-butylene copolymers, propylene-acrylic acid copolymers, propylene-maleic anhydride copolymers and the like.

One or more of these olefin homopolymers or olefin copolymers can be used.

The thermoplastic polymer composition of the present invention can optionally contain a thermosetting polyurethane resin, a polyamide resin, a polyester resin, a polyvinylidene chloride resin, a polyvinyl chloride resin, a polycarbonate resin, an acrylic resin, a polyoxymethylene resin, a saponified ethylene-vinyl acetate copolymer, or a copolymer of an aromatic vinyl compound and at least one of an olefin or a vinyl compound having a cyano group, within the extent where effects of the invention is retained. In addition, the thermoplastic polymer composition of the present invention can optionally contain an additional component, examples of which include additives such as plasticizers, e.g., paraffin oil, colorants, flame retardants, ultraviolet absorbents, antioxidants, hydrolysis inhibitors, fungicides, antifungal agents and stabilizers; fibers such as glass fibers and polyester fibers; fillers such as talc, silica and wood powder; various coupling agents, and the like.

The ratio R ($\eta a_2/\eta a_1$) of the melt-viscosity ($\eta a_2$) of the thermoplastic polymer composition when kept at 200° C. under the load of 490.3 N [50 kgf] for 60 minutes based on the melt-viscosity ($\eta a_1$) of the thermoplastic polymer composition when the urethane bond contained therein reaches to dissociation equilibrium at 200° C. under the load of 490.3 N [50 kgf], should be within the range of 0.9 to 1.4. When the ratio R ($\eta a_2/\eta a_1$) of the melt-viscosity of the thermoplastic polymer composition falls within the above-described range, the thermoplastic polymer composition of the present invention has excellent melt-moldability, particularly melt-retention stability.

The ratio R ($\eta a_2/\eta a_1$) of the melt-viscosity of the thermoplastic polymer composition falls preferably between 0.95 and 1.3, and more preferably between 0.97 and 1.2.

The ratio R ($\eta a_2/\eta a_1$) of the melt-viscosity of the thermoplastic polymer composition can be set within a desired range by controlling the amount of the compounds (b) and (c), the manner of addition of the compounds (b) and (c) in the preparation of the thermoplastic polymer composition, and the like.

The thermoplastic polymer composition according to the present invention can be prepared by using the above-mentioned block copolymer (a), compounds (b) and (c)., polymer (d) or other components, as needed. However, in order to set the ratio R ($\eta a_2/\eta a_1$) of the melt-viscosity thereof within the above-described range, the thermoplastic polymer composition according to the present invention is preferably prepared by producing the block copolymer (a) in the presence of the compound (b), followed by the addition of the compound (c). In particular, the following method A or B is convenient and desirable.

(Method A)

A functionality block copolymer mentioned above, a high polymer polyol, a chain extender and an organic diisocyanate are reacted in the presence of a compound (b) to give a product, followed by the addition of a compound (c).

(Method B)

A functionality block copolymer mentioned above and a reaction product of a high polymer polyol, a chain extender and an organic diisocyanate are reacted in the presence of a compound (b) to give a product, followed by the addition of a compound (c).

In the method A, it is preferred that all of the compound (b) is present in the reaction system at the start of the reaction of the functionality block copolymer, the high polymer polyol, the chain extender and the organic diisocyanate. In the alternatives, the compound (b) maybe added to the reaction system after the reaction of the functionality block copolymer, the high polymer polyol, the chain extender and the organic diisocyanate starts. Also, a part of the compound (b) may be present in the reaction system at the start of the reaction of the functionality block copolymer, the high polymer polyol, the chain extender and the organic diisocyanate, and the rest of the compound (b) may be added to the reaction system after the reaction starts. The compound (b) can be added alone or as a composition mixed with one or more of the raw materials such as the functionality block copolymer, the high polymer polyol, the chain extender and the organic diisocyanate. Among them, the compound (b) is preferably mixed with the high polymer polyol.

Also, the compound (c) is preferably added after the reaction product of the functionality block copolymer, the high polymer polyol, the chain extender and the organic diisocyanate attains desired properties of, especially, melt-viscosity.

Moreover, the optional polymer (d) and other components may be added at the start or in the course of the reaction of the functionality block copolymer, the high polymer polyol, the chain extender and the organic diisocyanate, or after the addition of the compound (c).

On the other hand, in the method B, it is preferred that all of the compound (b) is present in the reaction system at the start of the reaction of the functionality block copolymer and the reaction product of the high polymer polyol, the chain extender and the organic diisocyanate. In the alternatives, a part of the compound (b) may be present in the reaction system at the start of the reaction of the functionality block copolymer and the reaction product of the high polymer polyol, the chain extender and the organic diisocyanate, and the rest of the compound (b) maybe added to the reaction system after the reaction starts. The compound (b) can be added alone or as a composition mixed with the functionality block copolymer or the reaction product. Among them, the compound (b) is preferably present in the reaction product of the high polymer polyol, the chain extender and the organic diisocyanate. In the more preferred embodiments, the compound (b) is mixed with one or more of the raw materials for the reaction product such as the high polymer polyol, the chain extender and the organic diisocyanate. In the still more preferred embodiments, the compound (b) is mixed with the high polymer polyol.

Also, similarly to the method A, the compound (c) is, preferably added after the reaction product of the functionality block copolymer and the reaction product of the high polymer polyol, the chain extender and the organic diisocyanate attains desired properties of, especially, melt-viscosity.

Moreover, the optional polymer (d) and other components may be added at the start or in the course of the reaction of the functionality block copolymer and the reaction product of the high polymer polyol, the chain extender and the organic diisocyanate, or after the addition of the compound (c).

With respect to both methods A and B, the amount of the compound (b) falls preferably between 0.1 ppm and 0.2% by weight, more preferably between 0.5 ppm and 0.02% by weight, and still more preferably between 1 ppm and 0.01% by weight, based on the total weight of the functionality block copolymer, the high polymer polyol, the chain extender and the organic diisocyanate or based on the total weight of the functionality block copolymer and the reaction product of the high polymer polyol, the chain extender and the organic diisocyanate. Also, the amount of the compound (c) falls preferably between 1 ppm and 2% by weight, more preferably between 5 ppm and 0.2% by weight, and still more preferably between 10 ppm and 0.1% by weight, based on the total weight of the functionality block copolymer, the high polymer polyol, the chain extender and the organic diisocyanate or based on the total weight of the functionality block copolymer and the reaction product of the high polymer polyol, the chain extender and the organic diisocyanate.

The thermoplastic polymer composition according to the present invention can be prepared according to the conventional urethane forming techniques. The thermoplastic polymer composition according to the present invention can be prepared by either "prepolymer process" or "one-shot process".

Specific examples of the reaction employed for forming polyurethane include the following methods [1] to [6].

[1] A functionality block copolymer, a high polymer polyol, a chain extender and a compound (b) are mixed, for example, while heating at the temperature of 40 to 100° C. An organic diisocyanate is added to the resulting mixture in amounts such that the molar ratio of the active hydrogen atoms based on the isocyanate groups falls preferably between 0.9 and 1.3, followed by stirring for a short time. Then, the resulting mixture is heated, for example, at the temperature of 80 to 200° C. to effect the polyurethane formation. Subsequently, a compound (c) is added to the reaction product and stirred for a short time, for example, at the temperature of 50 to 160° C. to give the thermoplastic polymer composition [classified as "Method A"].

[2] A functionality block copolymer, a high polymer polyol, a chain extender, an organic diisocyanate and a compound (b) are mixed in amounts such that the molar ratio of the active hydrogen atoms based on the isocyanate groups falls preferably between 0.9 and 1.3. The resulting mixture is kneaded, for example, at the temperature of 180 to 260° C. to effect the polyurethane formation. Subsequently, a compound (c) is added to the reaction product to give the thermoplastic polymer composition [classified as "Method A"].

[3] A high polymer polyol, a chain extender, an organic diisocyanate and a compound (b) are continuously fed into an extruder such as a multi-screw extruder and heated, for example, at the temperature of 90 to 260° C. A functionality block copolymer is continuously fed into the heated mixture at a rate such that the molar ratio of the active hydrogen atoms based on the isocyanate, groups falls preferably between 0.9 and 1.3, and continuously melt-polymerized, for example, at the temperature of 180 to 260° C. to effect the polyurethane formation. Subsequently, a compound (c) is added to the reaction product to give the thermoplastic polymer composition [classified as "Method B"].

[4] A functionality block copolymer, a high polymer polyol, a chain extender, an organic diisocyanate and a compound (b) are continuously fed into an extruder such as a multi-screw extruder at a rate such that the molar ratio of the active hydrogen atoms based on the isocyanate groups falls preferably between 0.9 and 1.3, and continuously melt-polymerized, for example, at the temperature of 180 to 260° C. to effect the polyurethane formation. Subsequently, a compound (c) is added to the reaction product to give the thermoplastic polymer composition [classified as "Method A"].

[5] A functionality block copolymer, a polyurethane, which may be commercially available, and a compound (b) are continuously fed into an extruder such as a multi-screw extruder and reacted, for example, at the temperature of 180 to 260° C. Subsequently, a compound (c) is added to the reaction product to give the thermoplastic polymer composition [classified as "Method B"].

[6] A functionality block copolymer, a high polymer polyol, a chain extender, an organic diisocyanate and a compound (b) are added to an organic solvent in amounts such that the molar ratio of the active hydrogen atoms based on the isocyanate groups falls preferably between 0.9 and 1.3, to effect the polyurethane formation. Subsequently, a compound (c) is added to the reaction mixture to give the thermoplastic polymer composition [classified as "Method A"].

Among these methods, the methods [1] to [5] which do not use an organic solvent are preferable. In particular, the methods [3] to [5] which use an extruder for continuous production are more preferred because they can efficiently produce the desired thermoplastic polymer composition.

By using a thermoplastic polymer composition according to the present invention, a variety of articles can be obtained smoothly by various molding methods such as injection molding, extrusion molding, inflation molding, blow molding, calendar molding, press molding, casting, and so on.

The thermoplastic polymer composition according to the present invention is non-tacky and has excellent thermal stability in the molten state. By using the thermoplastic polymer composition according to the present invention, a molded article having high qualities can be produced with good productivity, because it is possible to avoid undesired phenomena such as short shot, burr, sink, burn mark and flow mark even when the melt retention time is long in the preparation thereof by injection molding and so on, and the article can be readily released from the mold. Also, by using the thermoplastic polymer composition according to the present invention, a film or a sheet having high qualities can be produced with good productivity, because it is possible to avoid undesired phenomena such as discharge pressure fluctuations and thickness variation even when the melt retention time is long in the preparation thereof by extrusion molding and so on, and the discharge stability can be attained.

Further, various articles such as a molded article, a sheet and a film, prepared by injection molding, extrusion molding and other moldings using the thermoplastic polymer composition according to the present invention, are non-tacky, have excellent properties such as thermal resistance, mechanical properties of tensile strength and tensile elongation at break, oil resistance, water resistance and elastic recovery, and show a low residual strain, proper flexibility and smooth surface with good surface properties. Therefore, they can be used in various applications such as conveyor belts, various key boards, laminates, various films or sheets for containers, hoses, tubes, automobile parts, machine parts, shoe soles, watchbands, packing materilas and vibration damper, while taking advantages of the above-described properties.

Moreover, the thermoplastic polymer composition according to the present invention has, in addition to the above-mentioned excellent properties, excellent melt-adhesiveness to various materials and can be melt-adhered to both resins with low polarity and resins with high polarity. Therefore, the thermoplastic polymer composition according to the present invention can be applied for producing various composite articles.

Representative examples of the composite articles comprising the thermoplastic polymer composition according to the present invention include, but are not limited thereto, laminate structures such as films and sheets. For example, the laminate structure can be a two-layered laminate structure having a layer of the thermoplastic polymer composition according to the present invention and a layer of another material, a three-layered laminate structure having a inner layer of the thermoplastic polymer composition according to the present invention between two outer layers [surface layers] of another material, a three-layered laminate structure where two layers of the thermoplastic polymer composition according to the present invention are laminated on both surfaces of a layer of another material, or a four or more-layered laminate structure in which a layer of the thermoplastic polymer composition according to the present invention and a layer of one or more of another material are alternately stacked.

Another material, which is laminated with the layer of the thermoplastic polymer composition according to the present invention, can include various thermoplastic resins, compositions thereof other than the thermoplastic polymer composition according to the present invention, thermosetting resins, papers, fabrics, metals, woods, ceramics and the like.

The composite articles can be prepared, for example, by (a) subjecting another material mentioned above to melt-coating with the thermoplastic polymer composition according to the present invention, (b) introducing the thermoplastic polymer composition according to the present invention in the molten state between two or more of another materials, followed by adhesion, (c) disposing [inserting] another material in the mold and charging the thermoplastic polymer composition according to the present invention in the molten state into the mold, followed by adhesion, or (d) co-extruding the thermoplastic polymer composition according to the present invention and another material, followed by adhesion, when another material is thermoplastic.

As described above, the thermoplastic polymer composition according to the present invention shows excellent melt-adhesiveness to both resins with low polarity and resins with high polarity, especially to resins with low polarity. The thermoplastic polymer composition according to the present invention can give various composite articles by melt-adhesion to various resins such as polystyrene resins, olefin-based polymers, polyurethane resins, polyamide resins, polyester resins, polyvinylidene chloride resins, polyvinyl chloride resins, polycarbonate resins, acrylic resins, polyoxymethylene resins, saponified ethylene-vinyl acetate copolymers and copolymers of an aromatic vinyl compound with at least one compound selected from a vinyl compound having a cyano group, a conjugated diene and an olefin; or compositions comprising the above-mentioned resins.

The composite article comprising the thermoplastic polymer composition according to the present invention can be applied for various kinds of interior automotive trims such as instrument panels, center panels, center console boxes, door trims, pillars, assist grips, steering wheels and airbag covers; automobile exterior parts such as protector moldings and bumpers; electrical household parts such as bumpers of vacuum cleaners, door stops of the refrigerator, camera grips, electrical machinery grips, remote control switches and various kinds of key tops of office automation equipments; sports goods such as swimming goggles; various kinds of cover parts; various industrial components with packings for the use of wear resisitance, sealing, sound insulation or vibration damping; electronic parts such as curled cord wire coverings; various films for food, medical care, agriculture and packaging; construction materials such as wall papers and decorative laminates; belts; hoses; tubes; mats; sheets; and electrical and electronic parts such as soundness gears; and so on.

Also, the thermoplastic polymer composition according to the present invention can be stored, transported and sold, as it is, for hot-melt adhesive. The thermoplastic polymer composition according to the present invention can be used as hot-melt adhesive, as needed, in the preparation of various products and composite articles mentioned above.

The hot-melt adhesive comprising the thermoplastic polymer composition according to the present invention can be formulated into, for example, granular types such as pellets, needle types, film types, sheet types or board types.

EXAMPLES

The present invention will be explained more specifically with reference to examples but the present invention is not restricted at all to such examples.

In the following Examples and Comparative Examples, the thermoplastic polymer composition was tested for the melt viscosity [melt-retention stability], extrusion moldability [states of a production of a film and the surface of the obtained film], injection moldability [states of the surface of the molded article], continuous moldability thereof, adhesion strength in the laminate structure and coating adhesion, according to the following methods.

(1) Melt Viscosity [Melt-retention Stability]

The thermoplastic polymer composition was dried at 80° C. under the pressure of 1333.2 Pa [10 Torr] or less for 1 hour, and tested for its melt viscosity using a flow tester [capillary rheometer, "CFT-500D", made by Shimadzu Corporation; nozzle shape: 1 mm in diameter and 10 mm in length]. Melt viscosities of the thermoplastic polymer composition at various retention times were measured at 200° C. under the load of 490.3N [50 kgf], and plotted with respect to the retention times. The melt viscosity at the time when the melt viscosity does not change according to the retention time was designated as melt viscosity ($\eta a_1$) when the urethane bond reaches to dissociation equilibrium. Also, the melt viscosity ($\eta a_2$) of the thermoplastic polymer composition when kept at 200° C. under the load of 490.3 N [50 kgf] for 60 minutes was determined.

The melt viscosity ratio was calculated according to the following equation. The melt viscosity ratio is considered as an index for melt-retention stability. If this value is in the range of 0.9 to 1.4, the thermoplastic polymer composition shows excellent melt-retention stability, because dissociation reactions of the urethane bonds and side reactions are suppressed.

Melt viscosity ratio $[R] = \eta a_2/\eta a_1$ (2) Extrusion Moldability Upon the Preparation of a Laminate Structure Three types of resins were fed respectively through three extruders [25 mm ϕ, cylinder temperature: 190 to 245° C.] to a common die set at 230° C., joined and adhered to each other, and extruded over a roll at 60° C. to be cooled to give a five-layered laminate structure having a structure of an outer layer of thickness of 50 μm/an adhesive layer of thickness of 10 μm/an inner layer of thickness of 50 μm/an adhesive layer of thickness of 10 μm/an outer layer of thickness of 50 μm. The appearance and smoothness of the laminate structure when the discharge rate was set to 4 kg/hr [film take-up speed: about 2 m/min] and 10 kg/hr [film take-up speed: 5 m/min] was observed and evaluated in accordance with the evaluation standards shown below.

Evaluation Standards of Extrusion Moldability

○: Both of the laminate structures obtained at the discharge rate of 4 kg/hr and 10 kg/hr have smooth surface and show no undesired phenomena such as unevenness and crook. In addition, the laminate structures were normally rolled up.

Δ: The laminate structure obtained at the discharge rate of 4 kg/hr has smooth surface and show no undesired phenomena such as unevenness and crook. In addition, the laminate structure was normally rolled up. On the other hand, the laminate structure obtained at the discharge rate of 10 kg/hr has a little roughened surface and show a little undesired phenomena such as unevenness and crook. And the laminate structure could be rolled up.

X: The laminate structure obtained at the discharge rate of 4 kg/hr has a little roughened surface and show a little undesired phenomena such as unevenness and crook. And the laminate structure could be rolled up. However, the laminate structure obtained at the discharge rate of 10 kg/hr has remarkable roughened surface and show remarkable undesired phenomena such as unevenness and crook. In addition, the laminate structure could not be rolled up normally.

(3) Injection Moldability Upon the Preparation of a Laminate Structure

A resin plate [outer layer; size: 120 mm in diameter and 1 mm in thickness] was disposed in a mold having a mirror finished surface, and the thermoplastic polymer composition prepared in the following Examples or Comparative Examples was injected in the mold [conditions: cylinder temperature of 200 to 220° C. and mold temperature of 40° C.] to give a laminate structure [size: 120 mm in diameter and 2 mm in thickness] in which a layer of the thermoplastic polymer composition [adhesive layer] was laminated on one surface of the resin plate. The surface appearance of the laminate structure was observed visually and evaluated in accordance with the evaluation standards shown below.

Evaluation Standards of Injection Moldability

○: The entire surface of the laminate structure is smooth without a flow mark.

Δ: A part of the surface of the laminate structure is not smooth with some flow marks.

X: Flow marks, prominences and depressions are observed throughout the surface of the laminate structure.

(4) Continuous Moldability Upon Extrusion Molding or Injection Molding

The continuous production of the laminate structure was conducted by the above-described molding process as in (2) [extrusion molding process] or in (3) [injection molding process] to determine the time when a laminate structure with high qualities had come to be not produced due to an undesired phenomena such as discharge pressure fluctuation, short shot, burr, sink, burn mark or flow mark on the surface of the laminate structure or due to a loss of the surface smoothness [uniform thickness] of the laminate structure. The evaluation standards are as follows.

Evaluation Standards of Continuous Moldability Upon Extrusion Molding or Injection Molding ○: Continuous molding can be conducted for 72 hours or more.

Δ: Continuous molding can be conducted for more than 24 hours and less than 72 hours.

X: Undesired phenomena has occurred within 24 hours.

(5) Adhesion Strength in the Laminate Structure

Using the thermoplastic polymer composition prepared in the following Examples and Comparative Examples, a five-layered laminate structure [an outer layer of thickness of 50 μm/an adhesive layer of thickness of 10 μm/an inner layer of thickness of 50 μm/an adhesive layer of 10 μm/an outer layer of thickness of 50 μm] was prepared according to the above-described extrusion molding process as in (2), and a two-layered laminate structure [size: 120 mm in diameter and 2 mm in thickness] was prepared by the above-described injection molding process as in (3). The laminate structure was cut into a test piece [size: 1 cm×8 cm] and subjected to 180 degrees peeling test using "Autograph IS-500D", made by Shimadzu Corporation, under the conditions of peeling speed of 300 mm/min at room temperature to determine the adhesion strength between the outer layer or the inner layer and the adhesive layer formed of the thermoplastic polymer composition.

When the adhesion strength between the outer layer and the adhesive layer or between the inner layer and the adhesive layer is very strong and the respective layers cannot be peeled resulting to the failure of conducting the peeling test, it is evaluated as "Impossible to peel". On the other hand, when the adhesion strength between the outer layer and the adhesive layer or between the inner layer and the adhesive layer is very weak and the respective layers can be readily delaminated by hands, it is evaluated as "Readily peeled".

(6) Evaluation of Coating Adhesion

On the surface of the adhesive layer, which was formed of thermoplastic polymer composition, of the laminate structure [size: 120 mm in diameter and 2 mm in thickness] prepared by the method described in (3), an urethane-based coating composition [two-component and organic solvent type; "Retan PG 80", trade name, made by Kansai Paint Co., Ltd.] was applied, followed by curing at 100° C. for 15 minutes. Then, the cured coating was made equally spaced cuts of 1 mm with a cutter knife to form 100 grids. An adhesive cellophane tape was sufficiently attached on the grids, then the tape was taken off quickly at an angle of 30 degrees with the coating surface. The grids on the coating were visually observed to determine the number of the grids left thereon, which is an index of coating adhesion.

Abbreviations and properties of the compounds as referred to in the following Examples and Comparative Examples are as follows.

[Functionality Block Copolymers]

TPS-1:

Hydrogenated tri-block copolymer having a hydroxyl group on one terminal of the molecule comprising polystyrene block-polyisoprene block-polystyrene block [average number of hydroxyl group per molecule: 0.7, styrene content: 30% by weight, number average molecular weight: 50,000, hydrogenation ratio in the polyisoprene block: 90%, 1,4-bond content in the polyisoprene block: 4.5 mol %, 1,2- and 3,4-bond content in the polyisoprene block: 55 mol %, MFR value (measured at 230° C., under the load of 2.16 kg): 13 g/10 min].

TPS-1 consists "HVSIS-OH-1" which is a hydrogenated tri-block copolymer having a hydroxyl group on one terminal of the molecule comprising polystyrene block-polyisoprene block-polystyrene block [styrene content: 30% by weight, number average molecular weight: 50,000, hydrogenation ratio in the polyisoprene block: 90%, 1,4-bond content in the polyisoprene block: 45 mol %, 1,2- and 3,4-bond content in the polyisoprene block: 55 mol %] and "HVSIS-1" which is a hydrogenated tri-block copolymer having no hydroxyl group on the molecule comprising polystyrene block-polyisoprene block-polystyrene block [styrene content: 30% by weight, number average molecular weight: 50,000, hydrogenation ratio in the polyisoprene block: 90%, 1,4-bond content in the polyisoprene block: 45 mol %, 1,2- and 3,4-bond content in the polyisoprene block: 55 mol %] at a molar ratio of HVSIS-OH-1/HVSIS-1=7/3.

TPS-2:

Hydrogenated tri-block copolymer having a hydroxyl group on one terminal of the molecule comprising polystyrene block-polyisoprene block-polystyrene block [average number of hydroxyl group per molecule: 0.8, styrene content: 25% by weight, number average molecular weight: 80,000, hydrogenation ratio in the polyisoprene block: 85%, 1,4-bond content in the polyisoprene block: 45 mol %, 1,2- and 3,4-bond content in the polyisoprene block: 55 mol %, MFR value (measured at 230, under the load of 2.16 kg): 6 g/10 min].

TPS-2 consists "HVSIS-OH-2" which is a hydrogenated tri-block copolymer having a hydroxyl group on one terminal of the molecule comprising polystyrene block-polyisoprene block-polystyrene block [styrene content: 25% by weight, number average molecular weight: 80,000, hydrogenation ratio in the polyisoprene block: 85%, 1,4-bond content in the polyisoprene block: 45 mol %, 1,2- and 3,4-bond content in the polyisoprene block: 55 mol %] and "HVSIS-2" which is a hydrogenated tri-block copolymer having no hydroxyl group on the molecule comprising polystyrene block-polyisoprene block-polystyrene block [styrene content: 25% by weight, number average molecular weight: 80,000, hydrogenation ratio in the polyisoprene block: 85%, 1,4-bond content in the polyisoprene block: 45 mol %, 1,2- and 3,4-bond content in the polyisoprene block: 55 mol %] at a molar ratio of HVSIS-OH-2/HVSIS-2=8/2.

Here, TPS-1 and TPS-2 were, respectively, prepared by, according to the method described in the Referential Example 2 of the Japanese Patent Application Laid-open No. Hei 7-118492, polymerizing styrene and isoprene successively under the presence of tetramethylethylenediamine in cyclohexane using sec-butyl lithium followed by the addition of ethylene oxide to give a block copolymer having a hydroxyl group at the terminal of the molecule, and subjecting the block copolymer to hydrogenation using a Ziegler catalyst.

TPS-3:

Hydrogenated tri-block copolymer having a hydroxyl group on one terminal of the molecule comprising polystyrene block-copolymer block of isoprene and butadiene-polystyrene block [average number of hydroxyl group per molecule: 0.9, styrene content: 30% by weight, number average molecular weight: 50,000, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %].

TPS-3 consists "SEEPS-OH" which is a hydrogenated tri-block copolymer having a hydroxyl group on one terminal of the molecule comprising polystyrene block-copolymer block of isoprene and butadiene-polystyrene block [styrene content: 30% by weight, number average molecular weight: 50,000, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %] and "SEEPS" which is a hydrogenated tri-block copolymer having no hydroxyl group on the molecule comprising polystyrene block-copolymer block of isoprene and butadiene-polystyrene block [styrene content: 30% by weight, number average molecular weight: 50,000, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %] at a molar ratio of SEEPS-OH/SEEPS=9/1.

TPS-3 was prepared by using styrene, isoprene and butadiene as raw materials according to the method described in the Referential Example 1 of the Japanese Patent Application Laid-open No. Hei 10-139963.

[High Polymer Polyols]

POH-1:
Polyester diol having a number average molecular weight of 1,500 prepared by the reaction of 3-methyl-1,5-pentanediol and adipic acid ["Kuraray Polyol P-1500", trade name, made by KURARAY Co., Ltd.]

POH-2:
Polyester diol having a number average molecular weight of 3,500 prepared by the reaction of 3-methyl-1,5-pentanediol and adipic acid ["Kuraray Polyol P-3500", trade name, made by KURARAY Co., Ltd.]

POH-3:
Poly(tetramethylene glycol) having a number average molecular weight of 2,000 ["PTMG-2000", trade name, made by Mitsubishi Chemical Corp.]

[Chain Extenders]
BD: 1,4-butanediol
MPD: 3-methyl-1,5-pentanediol

[Organic Diisocyanate]
MDI: 4,4'-diphenylmethane diisocyanate

[Compound (b)]
CAT-1: dibutyltin diacetate
CAT-2: tetraisopropyl titanate

[Compound (c)]
INACT: distearyl phosphate

[Resins Used for the Manufacture of a Laminate Structure]
PP:
Polypropylene ["Grand Polypro F109BB", trade name, made by Grand Polymer Inc.,]

TPU:
Thermoplastic polyurethane ["KURAMIRON 8170", trade name, made by KURARAY Co., Ltd.]

Example 1

(1) Preparation of a Thermoplastic Polymer Composition

A high polymer polyol [POH-1] containing 10 ppm of dibutyltin diacetate [CAT-1], a chain extender [BD] and an organic diisocyanate [MDI] were fed into the feed zone of a twin-screw extruder [30 mm φ, L/D=36; the heating zone is divided into the feed zone, the compression zone and the metering zone] with coaxial screws, wherein their molar ratio of POH-1:BD:MDI was 1.0:3.5:4.5 [nitrogen atom content: 4.3% by weight] and their total feed rate was 90 g/min, and continuously melt-polymerized at 260° C. to effect the polyurethane formation. A functionality block copolymer [TPS-1] was continuously fed into the compression zone of the twin-screw extruder at a feed rate of 110 g/min to effect the reaction with the resulting product of the above-described polyurethane formation.

Then, distearyl phosphate [INACT] was fed into the metering zone of the twin-screw extruder at a feed rate of 0.013 g/min to give a melt of the thermoplastic polymer composition. The melt was continuously extruded into water as a strand, and the resulting strands were cut in pellets with a palletizing machine. The resulting pellets were dried at 80° C. for 4 hours to give the thermoplastic polymer composition [1]. The thermoplastic polymer composition [1] was tested for its melt viscosity according to the above-described method to calculate the melt viscosity ratio R ($\eta a_2/\eta a_1$). The results are shown in Table 1.

A part of the thermoplastic polymer composition [1] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [1]. $^1$H-NMR analysis showed that the block copolymer [1] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 195 parts by weight of the polyurethane, 0 part by weight of the HVSIS-OH-1, 88 parts by weight of the HVSIS-1 and 150 parts by weight of the tri-block copolymer, respectively, based on 100 parts by weight of the di-block copolymer. In addition, the amounts of the CAT-1 and the INACT in the thermoplastic polymer composition [1] were calculated, according to the feed amount, as 2.3 ppm of the CAT-1 and 65 ppm of the INACT, respectively, based on the weight of the thermoplastic polymer composition.

Each of the polymer blocks (I) of the di-block copolymer and the tri-block copolymer had the same profiles as those of the HVSIS-1. The number average molecular weight of the di-block copolymer was 84,000. Also, the number average molecular weight of the tri-block copolymer was 102,000.

(2) Preparation of a Laminate Structure

By using the thermoplastic polymer composition [1] obtained in the above (1), above-described PP and TPU, the extrusion moldability and the continuous extrusion moldability were evaluated. In addition, the adhesion strength in the resulting laminate structure was determined according to the above-described method. Results are shown in Table 1.

Example 2

Procedures of the Example 1 were repeated except that high polymer polyol [POH-2], chain extender [BD], organic diisocyanate [MDI], block copolymer [TPS-2], compound (b) [CAT-1] and compound (c) [INACT] were used at a rate shown in the Table 1 to give a thermoplastic polymer composition [2]. The melt viscosity of the thermoplastic polymer composition [2] was measured according to the above-described method to determine the melt viscosity ratio R ($\eta a_2/\eta a_1$) which was employed as the basis for the evaluation of melt-retention stability. Results are shown in Table 1.

A part of the thermoplastic polymer composition [2] was sampled and the polyurethane contained therein was extracted therefrom with dimethylformamide. Next, the HVSIS-2 and the unreacted HVSIS-OH-2 were extracted from the sample with cyclohaxane. The remaining solid was dried to give a block copolymer [2]. $^1$H-NMR analysis showed that the block copolymer [2] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-2, the HVSIS-2 and the tri-block copolymer, which were extracted with cyclohexane, were 192 parts by weight of the polyurethane, 0 part by weight of the HVSIS-OH-2, 50 parts by weight of the HVSIS-2 and 163 parts by weight of the tri-block copolymer, respectively, based on 100 parts by weight of the di-block copolymer. In addition, the amounts of the CAT-1 and the INACT in the thermoplastic polymer composition [2] were calculated, according to the feed amount, as 5.9 ppm of the CAT-1 and 30 ppm of the INACT, respectively, based on the weight of the thermoplastic polymer composition.

Each of the polymer blocks (I) of the di-block copolymer and the tri-block copolymer had the same profiles as those of the HVSIS-2. The number average molecular weight of the di-block copolymer was 160,000. Also, the number average molecular weight of the tri-block copolymer was 170,000.

By using the thermoplastic polymer composition [2], above-described PP and TPU, the extrusion moldability and the continuous extrusion moldability were evaluated as in the Example 1. Also, the adhesion strength in the resulting laminate structure was determined. Results are shown in Table 1.

Example 3

Procedures of the Example 1 were repeated except that high polymer polyol [POH-1], chain extender [BD], organic diisocyanate [MDI], block copolymer [TPS-1], compound (b) [CAT-1] and compound (c) [INACT] were used at a rate shown in Table 1 to give a thermoplastic polymer composition [3]. The melt viscosity of the thermoplastic polymer composition [3] was measured according to the above-described method to determine the melt viscosity ratio R ($\eta a_2/\eta a_1$) which was employed as the basis for the evaluation of melt-retention stability. Results are shown in the Table 1.

A part of the thermoplastic polymer composition [3] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [3]. $^1$H-NMR analysis showed that the block copolymer [3] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 167 parts by weight of the polyurethane, 0 part by weight of the HVSIS-OH-1, 71 parts by weight of the HVSIS-1 and 138 parts by weight of the tri-block copolymer, respectively, based on 100 parts by weight of the di-block copolymer. In addition, the amounts of the CAT-1 and the INACT in the thermoplastic polymer composition [3] were calculated, according to the feed amount, as 5.4 ppm of the CAT-1 and 100 ppm of the INACT, respectively, based on the weight of the thermoplastic polymer composition.

Each of the polymer blocks (I) of the di-block copolymer and the tri-block copolymer had the same profiles as those of the HVSIS-1. The number average molecular weight of the di-block copolymer was 113,000. Also, the number average molecular weight of the tri-block copolymer was 113,000.

By using the polymer composition comprising 100 parts by weight of the thermoplastic polymer composition [3] and 10 parts by weight of the PP, above-described PP and TPU, the extrusion moldability and the continuous extrusion moldability were evaluated as in the Example 1. Also, the adhesion strength in the resulting laminate structure was determined. Results are shown in Table 1.

Comparative Example 1

Procedures of the Example 1 were repeated except that high polymer polyol [POH-1], chain extender [BD], organic diisocyanate [MDI], block copolymer [TPS-1] and compound (b) [CAT-1] were used at a rate shown in the Table 1 and compound (c) [INACT] was not used to give a thermoplastic polymer composition [C1]. The melt viscosity of the thermoplastic polymer composition [C1] was measured according to the above-described method to determine the melt viscosity ratio R ($\eta a_2/\eta a_1$) which was employed as the basis for the evaluation of melt-retention stability. Results are shown in Table 1.

A part of the thermoplastic polymer composition [C1] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [C1]. $^1$H-NMR analysis showed that the block copolymer [C1] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 218 parts by weight of the polyurethane, 0 part by weight of the HVSIS-OH-1, 61 parts by weight of the HVSIS-1 and 127 parts by weight of the tri-block copolymer, respectively, based on 100 parts by weight of the di-block copolymer. In addition, the amount of the CAT-1 in the thermoplastic polymer composition [C1] was calculated, according to the feed amount, as 9.4 ppm based on the weight of the thermoplastic polymer composition.

Each of the polymer blocks (I) of the di-block copolymer and the tri-block copolymer had the same profiles as those of the HVSIS-1. The number average molecular weight of the di-block copolymer was 128,000. Also, the number average molecular weight of the tri-block copolymer was 128,000.

By using the thermoplastic polymer composition [C1], above-described PP and TPU, the extrusion moldability and the continuous extrusion moldability were evaluated as in the Example 1. Also, the adhesion strength in the resulting laminate structure was determined. Results are shown in Table 1.

Comparative Example 2

Procedures of the Example 1 were repeated except that high polymer polyol [POH-2], chain extender [BD], organic diisocyanate [MDI], block copolymer [TPS-1] and compound (c) [INACT] were used at a rate shown in Table 1 and compound (b) (CAT-1) was not used to give a thermoplastic polymer composition [C2]. The melt viscosity of the thermoplastic polymer composition [C2] was measured according to the above-described method to determine the melt viscosity ratio R ($\eta a_2/\eta a_1$) which was employed as the basis for the evaluation of melt-retention stability. Results are shown in the Table 1.

A part of the thermoplastic polymer composition [C2] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [C2]. $^1$H-NMR analysis showed that the block copolymer [C2] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 764 parts by weight of the polyurethane, 0 part by weight of the HVSIS-OH-1, 221 parts by weight of the HVSIS-1 and 614 parts by weight of the tri-block copolymer, respectively, based on 100 parts by weight of the di-block copolymer. In addition, the amount of the INACT in the thermoplastic polymer composition [C2] was calculated, according to the feed amount., as 50 ppm based on the weight of the thermoplastic polymer composition.

Each of the polymer blocks (I) of the di-block copolymer and the tri-block copolymer had the same profiles as those of the HVSIS-1.

By using the thermoplastic polymer composition [C2], above-described PP and TPU, the extrusion moldability and the continuous extrusion moldability were evaluated as in the Example 1. Also, the adhesion strength in the resulting laminate structure was determined. Results are shown in Table 1.

Comparative Example 3

Procedures of the Example 1 were repeated except that high polymer polyol [POH-1], chain extender [BD], organic diisocyanate [MDI], block copolymer [TPS-2], compound (b) [CAT-1] and compound (c) [INACT] were used at a rate shown in Table 1 to give a thermoplastic polymer composition [C3]. The melt viscosity of the thermoplastic polymer composition [C3] was measured according to the above-described method to determine the melt viscosity ratio R ($\eta a_2/\eta a_1$) which was employed as the basis for the evaluation of melt-retention stability. Results are shown in the Table 1.

By using the thermoplastic polymer composition [C3], above-described PP and TPU, the extrusion moldability and the continuous extrusion moldability were evaluated as in the Example 1. Also, the adhesion strength in the resulting laminate structure was determined. Results are shown in Table 1.

TABLE 1

|  | Examples | | | Comparative Examples | | |
| --- | --- | --- | --- | --- | --- | --- |
|  | 1 | 2 | 3 | 1 | 2 | 3 |
| [Raw materials] | | | | | | |
| High polymer polyols | | | | | | |
| Species | POH-1 | POH-2 | POH-1 | POH-1 | POH-2 | POH-1 |
| Molar ratio[1] | 1.0 | 1.0 | 1.0 | 1.0 | 1.0 | 1.0 |
| Compound (b) [CAT-1; ppm[2]] | 2.3 | 5.9 | 5.4 | 9.4 | 0 | 2.4 |
| Chain extender [BD; molar ratio[1]] | 3.5 | 2.0 | 3.1 | 3.3 | 3.1 | 22.5 |

TABLE 1-continued

|  | Examples | | | Comparative Examples | | |
| --- | --- | --- | --- | --- | --- | --- |
|  | 1 | 2 | 3 | 1 | 2 | 3 |
| Organic diisocyanate [MDI] | | | | | | |
| Molar ratio[1] | 4.5 | 3.0 | 4.1 | 4.3 | 4.1 | 23.5 |
| Content of nitrogen atom [% by weight[3]] | 4.3 | 1.9 | 4.1 | 4.2 | 2.4 | 7.0 |
| Functionality block copolymers | | | | | | |
| Species | TPS-1 | TPS-2 | TPS-1 | TPS-1 | TPS-1 | TPS-2 |
| Amount [% by weight[4]] | 55 | 50 | 50 | 40 | 45 | 50 |
| Compound (c) | | | | | | |
| Amount [ppm[2]] | 65 | 30 | 100 | 0 | 50 | 50 |
| Amount of phosphorus atom [mols/1 mol of tin atom] | 4.3 | 0.8 | 2.8 | 0 | — | 3.2 |
| [Thermoplastic polymer composition] | | | | | | |
| Melt viscosity $\eta a_1$ [poise] | 11,900 | 8,700 | 15,200 | 11,800 | 4,200 | Could not be measured |
| Melt viscosity $\eta a_2$ [poise] | 12,900 | 9,100 | 17,500 | 20,600 | 3,100 | Could not be measured |
| Melt viscosity ratio [$\eta a_2/\eta a_1$] | 1.08 | 1.05 | 1.15 | 1.75 | 0.74 | — |
| [Laminate structure] | | | | | | |
| Outer layer/inner layer | PP/TPU | PP/TPU | PP/TPU | PP/TPU | PP/TPU | PP/TPU |
| Extrusion moldability | ○ | ○ | ○ | ○ | Δ | X |
| Continuous extrusion moldability | ○ | ○ | ○ | X | X | X |
| Adhesion strength with the outer layer [kgf/cm] | Impossible to peel | Impossible to peel | Impossible to peel | 0.8 | 1.0 | Readily peeled |
| Adhesion strength with the inner layer [kgf/cm] | Impossible to peel | Impossible to peel | Impossible to peel | Impossible to peel | Impossible to peel | Readily peeled |

Notes:
[1]The molar ratio of the chain extender and the organic diisocyanate based on the high polymer polyol.
[2]The weight ratio based on the total weight of the functionality block copolymer, the high polymer polyol, the chain extender, the organic diisocyanate, the compound (b) and the compound (c).
[3]The weight ratio based on the total weight of the high polymer polyol, the chain extender and the organic diisocyanate.
[4]The weight ratio based on the total weight of the functionality block copolymer, the high polymer polyol, the chain extender and the organic diisocyanate.

Example 4

Procedures of the Example 1 were repeated except that high polymer polyol [POH-3], chain extender [BD], organic diisocyanate [MDI], block copolymer [TPS-1], compound (b) [CAT-1] and compound (c) [INACT] were used at a rate shown in Table 2 to give a thermoplastic polymer composition [4]. The melt viscosity of the thermoplastic polymer composition [4] was measured according to the above-described method to determine the melt viscosity ratio R ($\eta a_2/\eta a_1$) which was employed as the basis for the evaluation of melt-retention stability. Results are shown in Table 2.

A part of the thermoplastic polymer composition [4] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [4]. $^1$H-NMR analysis showed that the block copolymer [4] was a di-block copolymer having one polymer block (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 200 parts by weight of the polyurethane, 0 part by weight of the HVSIS-OH-1, 113 parts by weight of the HVSIS-1 and 213 parts by weight of the tri-block copolymer, respectively, based on 100 parts by weight of the di-block copolymer. In addition, the amounts of the CAT-1 and the INACT in the thermoplastic polymer composition [4] were calculated, according to the feed amount, as 16.5 ppm of the CAT-1 and 300 ppm of the INACT, respectively, based on the weight of the thermoplastic polymer composition.

Each of the polymer blocks (I) of the di-block copolymer and the tri-block copolymer had the same profiles as those of the HVSIS-1.

By using the thermoplastic polymer composition [4] and above-described PP [for the outer layer], the injection moldability and the continuous injection moldability were evaluated. Also, the adhesion strength and the coating adhesion of the resulting laminate structure were evaluated according to the above-described method. Results are shown in Table 2.

Example 5

Procedures of the Example 1 were repeated except that high polymer polyol [POH-3], chain extender [BD], organic diisocyanate [MDI], block copolymer [TPS-2], compound (b) [CAT-1] and compound (c) [INACT] were used at a rate shown in the Table 2 to give a thermoplastic polymer composition [5]. The melt viscosity of the thermoplastic polymer composition [5] was measured according to the above-described method to determine the melt viscosity ratio R ($\eta a_2/\eta a_1$) which was employed as the basis for the evaluation of melt-retention stability. Results are shown in Table 2.

A part of the thermoplastic polymer composition [5] was sampled and the polyurethane contained therein was extracted therefrom with dimethylformamide. Next, the HVSIS-2 and the unreacted HVSIS-OH-2 were extracted from the sample with cyclohaxane. The remaining solid was dried to give a block copolymer [5]. $^1$H-NMR analysis showed that the block copolymer [5] was a di-block copolymer having one polymer block (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit.

The amounts of the polyurethane, which was extracted with dimethylformamide, the HVSIS-OH-2, the HVSIS-2 and the tri-block copolymer, which were extracted with cyclohexane, were 124 parts by weight of the polyurethane, 0 part by weight of the HVSIS-OH-2, 92 parts by weight of the HVSIS-2 and 300 parts by weight of the tri-block copolymer, respectively, based on 100 parts by weight of the di-block copolymer. In addition, the amounts of the CAT-1 and the INACT in the thermoplastic polymer composition [5] were calculated, according to the feed amount, as 15.1 ppm of the CAT-1 and 500 ppm of the INACT, respectively, based on the weight of the thermoplastic polymer composition.

Each of the polymer blocks (I) of the di-block copolymer and the tri-block copolymer had the same profiles as those of the HVSIS-2.

By using the thermoplastic polymer composition [5] and above-described PP [for the outer-layer], the injection moldability and the continuous injection moldability were evaluated. Also, the adhesion strength and the coating adhesion of the resulting laminate structure were evaluated according to the above-described method. Results are shown in Table 2.

Comparative Example 4

Procedures of the Example 1 were repeated except that high polymer polyol [POH-3], chain extender [BD], organic diisocyanate [MDI], block copolymer [TPS-1] and compound (b) [CAT-1] were used at a rate shown in the Table 2 and compound (c) [INACT] was not used to give a thermoplastic polymer composition [C4]. The melt viscosity of the thermoplastic polymer composition [C4] was measured according to the above-described method to determine the melt viscosity ratio R ($\eta a_2/\eta a_1$) which was employed as the basis for the evaluation of melt-retention stability. Results are shown in Table 2.

A part of the thermoplastic polymer composition [C4] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [C4]. $^1$H-NMR analysis showed that the block copolymer [C4] was a di-block copolymer having one polymer block (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 175 parts by weight of the polyurethane, 0 part by weight of the HVSIS-OH-1, 75 parts by weight of the HVSIS-1 and 150 parts by weight of the tri-block copolymer, respectively, based on 100 parts by weight of the di-block copolymer. In addition, the amount of the CAT-1 in the thermoplastic polymer composition [C4] was calculated, according to the feed amount, as 16.6 ppm based on the weight of the thermoplastic polymer composition.

By using the thermoplastic polymer composition [C4] and above-described PP [for the outer layer], the injection moldability and the continuous injection moldability were evaluated. Also, the adhesion strength and the coating adhesion of the resulting laminate structure were evaluated according to the above-described method. Results are shown in Table 2.

Comparative Example 5

Procedures of the Example 1 were repeated except that high polymer polyol [POH-3], chain extender [BD], organic diisocyanate [MDI], block copolymer [TPS-2], compound (b) [CAT-1] and compound (c) [INACT] were used at a rate shown in the Table 2 to give a thermoplastic polymer composition [C5]. The melt viscosity of the thermoplastic polymer composition [C5] was measured according to the above-described method to determine the melt viscosity ratio R ($\eta a_2/\eta a_1$) which was employed as the basis for the evaluation of melt-retention stability. Results are shown in Table 2.

By using the thermoplastic polymer composition [C5] and above-described PP [for the outer layer], the injection moldability and the continuous injection moldability were evaluated. Also, the adhesion strength and the coating adhesion of the resulting laminate structure were evaluated according to the above-described method. Results are shown in Table 2.

Comparative Example 6

A high polymer polyol [POH-3] containing 50 ppm of compound (b) [CAT-1] and 285 ppm of compound (c) [INACT], a chain extender [BD] and an organic diisocyanate [MDI] were fed into the feed zone of a twin-screw extruder [30 mm φ, L/D=36; the heating zone is divided into the feed zone, the compression zone and the meteringzone] with coaxial screws, wherein their molar ratio of POH-3:BD:MDI was 1.0:2.6:3.6 [nitrogen atom content: 3.2% by weight] and their total feed rate was 110 g/min, and continuously melt-polymerized at 260. A functionality block copolymer [TPS-2] was continuously fed into the compression zone of the twin-screw extruder at a feed rate of 90 g/min to effect the reaction with the resulting product of the above-described melt-polymerization. The resulting melt was continuously extruded into water as a strand, and the resulting strands were cut in pellets with a palletizing machine. The resulting pellets were dried at 80° C. for 4 hours to give the thermoplastic polymer composition [C6]. The melt viscosity of the thermoplastic polymer composition [C6] was measured according to the above-described method to determine the melt viscosity ratio R ($\eta a_2/\eta a_1$) which was employed as the basis for the evaluation of melt-retention stability. Results are shown in Table 2.

A part of the thermoplastic polymer composition [C6] was sampled and the polyurethane contained therein was extracted therefrom with dimethylformamide. Next, the HVSIS-2 and the unreacted HVSIS-OH-2 were extracted from the sample with cyclohaxane. The remaining solid was dried to give a block copolymer [C6]. $^1$H-NMR analysis showed that the block copolymer [C6] was a di-block copolymer having one polymer block (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(tetramethylene glycol) unit, 4,4'-diphenylmethane diisocyanate unit and 1,4-butanediol unit.

The amounts of the polyurethane, which was extracted with dimethylformamide, the HVSIS-OH-2, the HVSIS-2 and the tri-block copolymer, which were extracted with cyclohexane, were 1020 parts by weight of the polyurethane, 0 part by weight of the HVSIS-OH-2, 177 parts by weight of the HVSIS-2 and 670 parts by weight of the tri-block copolymer, respectively, based on 100 parts by weight of the di-block copolymer. In addition, the amounts of the CAT-1 and the INACT in the thermoplastic polymer composition [C6] were calculated, according to the feed amount, as 17.3 ppm of the CAT-1 and 100 ppm of the INACT, respectively, based on the weight of the thermoplastic polymer composition.

Each of the polymer blocks (I) of the di-block copolymer and the tri-block copolymer had the same profiles as those of the HVSIS-2.

(2) By using the thermoplastic polymer composition [C6] and above-described PP [for the outer layer], the injection moldability and the continuous injection moldability were evaluated. Also, the adhesion strength and the coating adhesion of the resulting laminate structure were evaluated according to the above-described method. Results are shown in Table 2.

TABLE 2

|  | Examples | | Comparative Examples | | |
|---|---|---|---|---|---|
|  | 4 | 5 | 4 | 5 | 6 |
| [Raw materials] | | | | | |
| High polymer polyol | | | | | |
| Species | POH-3 | POH-3 | POH-3 | POH-3 | POH-3 |
| Molar ratio[1] | 1.0 | 1.0 | 1.0 | 1.0 | 1.0 |
| Compound (b) [CAT-1; ppm[2]] | 16.5 | 15.1 | 16.6 | 20 | 17.3 |
| Chain extender [BD; molar ratio[1]] | 1.9 | 3.2 | 2.2 | 2.4 | 2.6 |
| Organic diisocyanate [MDI] | | | | | |
| Molar ratio[1] | 2.9 | 4.2 | 3.2 | 3.4 | 3.6 |
| Content of nitrogen atom [% by weight[3]] | 2.8 | 3.5 | 3.0 | 3.1 | 3.2 |
| Functionality block copolymers | | | | | |
| Species | TPS-1 | TPS-2 | TPS-1 | TPS-2 | TPS-2 |
| Amount [% by weight[4]] | 60 | 75 | 50 | 95 | 45 |
| Compound (c) | | | | | |
| Amount [ppm[2]] | 300 | 500 | 0 | 200 | 100 |
| Amount of phosphorus atom [mols/1 mol of tin atom] | 2.8 | 5.0 | 0 | 15.2 | 0.9 |
| [Thermoplastic polymer composition] | | | | | |
| Melt viscosity $\eta a_1$ [poise] | 25,900 | 18,700 | 23,200 | 10,500 | 7,800 |
| Melt viscosity $\eta a_2$ [poise] | 26,700 | 19,300 | 57,500 | 10,700 | 14,100 |
| Melt viscosity ratio [$\eta a_2/\eta a_1$] | 1.03 | 1.03 | 2.48 | 1.02 | 1.81 |
| [Laminate structure] | | | | | |
| Resin plate | PP | PP | PP | PP | PP |
| Injection moldability | ○ | ○ | Δ | Δ | Δ |
| Continuous injection moldability | ○ | ○ | X | X | X |
| Adhesion strength to the resin plate [kgf/cm] | Impossible to peel | Impossible to peel | 1.2 | 1.0 | 1.0 |
| Coating adhesion [number of grids left] | 100 | 100 | 100 | 0 | 75 |

Notes:
[1] The molar ratio of the chain extender and the organic diisocyanate based on the high polymer polyol.
[2] The weight ratio based on the total weight of the functionality block copolymer, the high polymer polyol, the chain extender, the organic diisocyanate, the compound (b) and the compound (c).
[3] The weight ratio based on the total weight of the high polymer polyol, the chain extender and the organic diisocyanate.
[4] The weight ratio based on the total weight of the functionality block copolymer, the high polymer polyol, the chain extender and the organic diisocyanate.

Example 6

(1) A functionality block copolymer [TPS-1], a high polymer polyol [POH-1] containing 10 ppm of compound (b) [CAT-1], a chain extender [BD] and an organic diisocyanate [MDI] were fed into the feed zone of a twin-screw extruder [30 mm φ, L/D=36; the heating zone is divided into the feed zone, the compression zone and the metering zone] with coaxial screws, wherein the feed rate of the TPS-1 was 110 g/min, the molar ratio of POH-1:BD:MDI was 1.0:3.5:4.5 [nitrogen atom content: 4.3% by weight] and the total feed rate of POH-1, BD and MDI was 90 g/min, and continuously melt-polymerized at 260° C. to effect the polyurethane formation.

Then, the compound (c) [INACT] was fed into the metering zone of the twin-screw extruder at a feed rate of 0.003 g/min to give a melt of the thermoplastic polymer composition. The melt was continuously extruded into water as a strand, and the resulting strands were cut in pellets with a palletizing machine. The resulting pellets were dried at 80° C. for 4 hours to give the thermoplastic polymer composition [6]. The melt viscosity of the thermoplastic polymer composition [6] was measured according to the above-described method to determine the melt viscosity ratio R ($\eta a_2/\eta a_1$) which was employed as the basis for the evaluation of melt-retention stability. Results are shown in Table 3.

A part of the thermoplastic polymer composition [6] was sampled and the polyurethane contained therein was extracted therefrom with dimethylformamide. Next, the HVSIS-1 and the unreacted HVSIS-OH-1 were extracted from the sample with cyclohaxane. The remaining solid was dried to give a block copolymer [6]. $^1$H-NMR analysis showed that the block copolymer [6] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-1, the HVSIS-1 and the tri-block copolymer, which were extracted with cyclohexane, were 431 parts by weight of the polyurethane, 0 part by weight of the HVSIS-OH-1, 206 parts by weight of the HVSIS-1 and 525 parts by weight of the tri-block copolymer, respectively, based on 100 parts by weight of the di-block copolymer. In addition, the amounts of the CAT-1 and the INACT in the thermoplastic polymer composition [6] were calculated, according to the feed amount, as 2.3 ppm of the CAT-1 and 15 ppm of the INACT, respectively, based on the weight of the thermoplastic polymer composition.

Each of the polymer blocks (I) of the di-block copolymer and the tri-block copolymer had the same profiles as those of the HVSIS-1.

(2) By using the thermoplastic polymer composition [6], above-described PP and TPU, the extrusion moldability and the continuous extrusion moldability were evaluated. Also, the adhesion strength in the resulting laminate structure was determined according to the above-described method. Results are shown in Table 3.

Example 7

(1) Preparation of a Thermoplastic Polyurethane A high polymer polyol [POH-2] containing 5 ppm of compound (b) [CAT-1], a chain extender [BD] and an organic diisocyanate [MDI] were fed into a twin-screw extruder [30 mm φ, L/D=36] with coaxial screws, wherein their molar ratio of POH-2:BD:MDI was 1.0:2.4:3.5 [nitrogen atom content: 2.1% by weight] and their total feed rate was 200 g/min, and continuously melt-polymerized at 260° C. to effect the polyurethane formation. The resulting melt was continuously extruded into water as a strand, and the resulting strands were cut in pellets with a palletizing machine. The resulting pellets were dried at 80° C. for 4 hours to give a thermoplastic polyurethane. The thermoplastic polyurethane was tested for the melt viscosity according to the above-described method to be found that the melt viscosity ($\eta a_1$) was 12,700 poises.

(2) Preparation of a Thermoplastic Polymer Composition

A functionality block copolymer [TPS-2] and the thermoplastic polyurethane obtained above (1) were fed into the feed zone of a twin-screw extruder [30 mm φ, L/D=36; the heating zone is divided into the feed zone, the compression zone and the metering zone], with coaxial screws, wherein the feed rate of the TPS-2 was 110 g/min and the feed rate of the thermoplastic polyurethane was 90 g/min, to effect their reaction.

Then, the compound (c) [INACT] was fed into the metering zone of the twin-screw extruder at a feed rate of 0.01 g/min to give a melt of the thermoplastic polymer composition. The melt was continuously extruded into water as a strand, and the resulting strands were cut in pellets with a pelletizing machine. The resulting pellets were dried at 80° C. for 4 hours to give the thermoplastic polymer composition [7]. The melt viscosity of the thermoplastic polymer composition [7] was measured according to the above-described method to determine the melt viscosity ratio R ($\eta a_2/\eta a_1$) which was employed as the basis for the melt-retention stability. Results are shown in Table 3.

A part of the thermoplastic polymer composition [7] was sampled and the polyurethane contained therein was extracted therefrom with dimethylformamide. Next, the HVSIS-2 and the unreacted HVSIS-OH-2 were extracted from the sample with cyclohaxane. The remaining solid was dried to give a block copolymer [7]. $^1$H-NMR analysis showed that the block copolymer [7] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-2, the HVSIS-2 and the tri-block copolymer, which were extracted with cyclohexane, were 127 parts by weight of the polyurethane, 0 part by weight of the HVSIS-OH-2, 370 parts by weight of the HVSIS-2 and 70 parts by weight of the tri-block copolymer, respectively, based on 100 parts by weight of the di-block copolymer. In addition, the amounts of the CAT-1 and the INACT in the thermoplastic polymer composition [7] were calculated, according to the feed amount, as 5 ppm of the CAT-1 and 50 ppm of the INACT, respectively, based on the weight of the thermoplastic polymer composition.

Each of the polymer blocks (I) of the di-block copolymer and the tri-block copolymer had the same profiles as those of the HVSIS-2.

(3) Preparation of a Laminate Structure

By using the thermoplastic polymer composition [7], above-described PP and TPU, the extrusion moldability and the continuous extrusion moldability were evaluated. Also, the adhesion strength in the resulting laminate structure was determined according to the above-described method. Results are shown in Table 3.

TABLE 3

|  | Examples | |
| --- | --- | --- |
|  | 6 | 7 |
| [Raw materials] | | |
| High polymer polyols | | |
| Species | POH-1 | POH-2 |
| Molar ratio[1] | 1.0 | 1.0 |
| Compound (b) [CAT-1; ppm[2]] | 2.3 | 5 |
| Chain extender [BD; molar ratio[1]] | 3.5 | 1.0 |
| Organic diisocyanate [MDI] | | |
| Molar ratio[1] | 4.5 | 2.4 |
| Content of nitrogen atom [% by weight[3]] | 4.3 | 3.5 |
| Functionality block copolymers | | |
| Species | TPS-1 | TPS-2 |
| Amount [% by weight[4]] | 55 | 55 |
| Compound (c) | | |
| Amount [ppm[2]] | 15 | 50 |
| Amount of phosphorus atom [mols/1 mol of tin atom] | 1.0 | 1.5 |
| [Thermoplastic polymer composition] | | |
| Melt viscosity $\eta a_1$ [poise] | 14,500 | 10,300 |
| Melt viscosity $\eta a_2$ [poise] | 14,800 | 10,600 |
| Melt viscosity ratio [$\eta a_2/\eta a_1$] | 1.02 | 1.03 |
| [Laminate structure] | | |
| Outer layer/inner layer | PP/TPU | PP/TPU |
| Extrusion moldability | ○ | ○ |
| Continuous extrusion moldability | ○ | ○ |
| Adhesion strength with the outer layer [kgf/cm] | Impossible to peel | Impossible to peel |
| Adhesion strength with the inner layer [kgf/cm] | Impossible to peel | Impossible to peel |

Notes:
[1]The molar ratio of the chain extender and the organic diisocyanate based on the high polymer polyol.
[2]The weight ratio based on the total weight of the functionality block copolymer, the high polymer polyol, the chain extender, the organic diisocyanate, the compound (b) and the compound (c).
[3]The weight ratio based on the total weight of the high polymer polyol, the chain extender and the organic diisocyanate.
[4]The weight ratio based on the total weight of the functionality block copolymer, the high polymer polyol, the chain extender and the organic diisocyanate.

From the results shown on the Tables 1 to 3, it is apparent that the thermoplastic polymer composition according to the present invention obtained in the Examples 1 to 7 shows excellent extrusion moldability and injection moldability, especially excellent continuous moldability. Also, it can be understood that the laminate structure comprising the thermoplastic polymer composition, prepared by extrusion molding or injection molding, has high adhesion strength between the layer of the thermoplastic polymer composition and the layer of a resin having low polarity or high polarity, and shows excellent coating adhesion, too.

Example 8

Procedures of the Example 1 were repeated except that high polymer polyol [POH-2], chain extender [BD], organic diisocyanate [MDI], block copolymer [TPS-3], compound (b) [CAT-1] and compound (c) [INACT] were used at a rate shown in Table 4 to give a thermoplastic polymer composition [8]. The melt viscosity of the thermoplastic polymer composition [8] was measured according to the above-described method to determine the melt viscosity ratio R ($\eta a_2/\eta a_1$) which was employed as the basis for the evaluation of melt-retention stability. Results are shown in Table 4.

A part of the thermoplastic polymer composition [8] was sampled and the polyurethane contained therein was extracted therefrom with dimethylformamide. Next, the SEEPS and the unreacted SEEPS-OH were extracted from the sample with cyclohaxane. The remaining solid was dried to give a block copolymer [8]. $^1$H-NMR analysis showed that the block copolymer [8] was a di-block copolymer having one polymer block (I) comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the SEEPS-OH, the SEEPS and the tri-block copolymer, which were extracted with cyclohexane, were 180 parts by weight of the polyurethane, 0 part by weight of the SEEPS-OH, 21 parts by weight of the SEEPS and 133 parts by weight of the tri-block copolymer, respectively, based on 100 parts by weight of the di-block copolymer. In addition, the amounts of the CAT-1 and the INACT in the thermoplastic polymer composition [8] were calculated, according to the feed amount, as 7.5 ppm of the CAT-1 and 150 ppm of the INACT, respectively, based on the weight of the thermoplastic polymer composition.

Each of the polymer blocks (I) of the di-block copolymer and the tri-block copolymer had the same profiles as those of the SEEPS. The number average molecular weight of the di-block copolymer was 75,000. Also, the number average molecular weight of the tri-block copolymer was 103,000.

Example 9

Procedures of the Example 1 were repeated except that high polymer polyol [POH-1], chain extender [MPD], organic diisocyanate [MDI], block copolymer [TPS-3], compound (b) [CAT-1] and compound (c) [INACT] were used at a rate shown in Table 4 to give a thermoplastic polymer composition [9]. The melt viscosity of the thermoplastic polymer composition [9] was measured according to the above-described method to determine the melt viscosity ratio R ($\eta a_2/\eta a_1$) which was employed as the basis for the evaluation of melt-retention stability. Results are shown in the Table 4.

A part of the thermoplastic polymer composition [9] was sampled and the polyurethane contained therein was extracted therefrom with dimethylformamide. Next, the SEEPS and the unreacted SEEPS-OH were extracted from the sample with cyclohaxane. The remaining solid was dried to give a block copolymer [9]. $^1$H-NMR analysis showed that the block copolymer [9] was a di-block copolymer having one polymer block (I) comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 3-methyl-1,5-pentanediol unit. In addition, GPC analysis showed that the extract by cyclohexane contained a tri-block copolymer having two polymer blocks (I) comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 3-methyl-1,5-pentanediol unit.

The amounts of the polyurethane, which was extracted with dimethylformamide, the SEEPS-OH, the SEEPS and the tri-block copolymer, which were extracted with cyclohexane, were 160 parts by weight of the polyurethane, 0 part by weight of the SEEPS-OH, 24 parts by weight of the SEEPS and 138 parts by weight of the tri-block copolymer, respectively, based on 100 parts by weight of the di-block copolymer. In addition, the amounts of the CAT-i and the INACT in the thermoplastic polymer composition [9] were calculated, according to the feed amount, as 2.3 ppm of the CAT-1 and 30 ppm of the INACT, respectively, based on the weight of the thermoplastic polymer composition.

Each of the polymer blocks (I) of the di-block copolymer and the tri-block copolymer had the same profiles as those of the SEEPS. The number average molecular weight of the di-block copolymer was 90,000. Also, the number average molecular weight of the tri-block copolymer was 102,000.

Example 10

Procedures of the Example 1 were repeated except that high polymer polyol [POH-2], chain extender [BD], organic diisocyanate [MDI], block copolymer [TPS-2], compound (b) [CAT-2] and compound (c) [INACT] were used at a rate shown in the Table 4 to give a thermoplastic polymer composition [10]. The melt viscosity of the thermoplastic polymer composition [10] was measured according to the above-described method to determine the melt viscosity ratio R ($\eta a_2/\eta a_1$) which was employed as the basis for the evaluation of melt-retention stability. Results are shown in Table 4.

A part of the thermoplastic polymer composition [10] was sampled and the polyurethane contained therein was extracted therefrom with dimethylformamide. Next, the HVSIS-2 and the unreacted HVSIS-OH-2 were extracted from the sample with cyclohaxane. The remaining solid was dried to give a block copolymer [10]. H-NMR analysis showed that the block copolymer [10] was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH-2, the HVSIS-2 and the tri-block copolymer, which were extracted with cyclohexane, were 166 parts by weight of the polyurethane, 0 part by weight of the HVSIS-OH-2, 43 parts by weight of the HVSIS-2 and 127 parts by weight of the tri-block copolymer, respectively, based on 100 parts by weight of the di-block copolymer. In addition, the amounts of the CAT-2 and the INACT in the thermoplastic polymer composition [10] were calculated, according to the feed amount, as 5 ppm of the CAT-2 and 100 ppm of the INACT, respectively, based on the weight of the thermoplastic polymer composition.

Each of the polymer blocks (I) of the di-block copolymer and the tri-block copolymer had the same profiles as those of the HVSIS-2. The number average molecular weight of the di-block copolymer was 160,000. Also, the number average molecular weight of the tri-block copolymer was 165,000.

TABLE 4

|  | Examples | | |
|---|---|---|---|
|  | 8 | 9 | 10 |
| [Raw materials] | | | |
| High polymer polyols | | | |
| Species | POH-2 | POH-1 | POH-2 |
| Molar ratio[1] | 1.0 | 1.0 | 1.0 |
| Compounds (b) [ppm[2]] | | | |
| CAT-1 | 7.5 | 2.3 | |
| CAT-2 | | | 5 |
| Chain extenders [molar ratio[1]] | | | |
| BD | 2.0 | | 2.0 |
| MPD | | 1.7 | |
| Organic diisocyanate [MDI] | | | |
| Molar ratio[1] | 3.0 | 2.7 | 3.0 |
| Content of nitrogen atom [% by weight[3]] | 1.9 | 3.2 | 1.9 |
| Functionality block copolymers | | | |
| Species | TPS-3 | TPS-3 | TPS-2 |
| Amount [% by weight[4]] | 50 | 55 | 50 |
| Compound (c) | | | |
| Amount [ppm[2]] | 150 | 30 | 100 |
| Amount of phosphorus atom [mols/1 mol of tin or titanium atom] | 3.1 | 2.0 | 6.2 |
| [Thermoplastic polymer composition] | | | |
| Melt viscosity $\eta a_1$ [poise] | 36,200 | 34,500 | 9,000 |
| Melt viscosity $\eta a_2$ [poise] | 38,200 | 34,000 | 8,600 |
| Melt viscosity ratio [$\eta a_2/\eta a_1$] | 1.06 | 0.99 | 0.96 |

Notes:
[1]The molar ratio of the chain extender and the organic diisocyanate based on the high polymer polyol.
[2]The weight ratio based on the total weight of the functionality block copolymer, the high polymer polyol, the chain extender, the organic diisocyanate, the compound (b) and the compound (c).
[3]The weight ratio based on the total weight of the high polymer polyol, the chain extender and the organic diisocyanate.
[4]The weight ratio based on the total weight of the functionality block copolymer, the high polymer polyol, the chain extender and the organic diisocyanate.

INDUSTRIAL APPLICABILITY

According to the present invention, thermoplastic polymer compositions having non-tackiness, excellent handling properties and melt-moldability are provided. The, thermoplastic polymer composition according to the present invention can give a molded article having high qualities with good productivity, because it shows, especially, thermal stability at a molten state.

The thermoplastic polymer composition according to the present invention can be used for various applications such as abase material for hot-melt adhesive, a production of a variety of molded articles and a production of composite articles with other materials.

The invention claimed is:

1. A thermoplastic polymer composition comprising a block copolymer (a) having a polymer block (I) of a block copolymer, which may be hydrogenated, of an aromatic vinyl compound polymer block and a conjugated diene polymer block, and a polymer block (II) of a polyurethane formed of a high polymer polyol, a chain extender and an organic diisocyanate; at least one compound (b) selected from organic tin compounds, organic titanium compounds and tertiary amines; and at least one compound (c) of a phosphorus compound and a phenolic compound and satisfying the following conditions (A) to (E):
   - (A): the high polymer polyol has a number average molecular weight of 500 to 10,000;
   - (B): the content of nitrogen derived from the organic diisocyanate in the polymer block (II) is within the range of 1 to 6.5% by weight based on the total weight of the high polymer polyol, the chain extender and the organic diisocyanate;
   - (C): the content of the compound (b) is from 0.1 ppm to 0.2% by weight based on the block copolymer (a);
   - (D): the content of the compound (c) is from 1 ppm to 2% by weight based on the block copolymer (a); and
   - (E): the melt viscosity of the thermoplastic polymer composition meets the following equation (I):

$$0.9 \leq \eta a_2 / \eta a_1 \leq 1.4 \qquad (I)$$

wherein $\eta a_1$ means a melt viscosity of the thermoplastic polymer composition when the urethane bond contained therein reaches to dissociation equilibrium at 200° C. under the load of 490.3 N [50 kgf], and $\eta a_2$ means a melt viscosity of the thermoplastic polymer composition when kept at 200° C. under the load of 490.3 N [50 kgf] for 60 minutes.

2. The thermoplastic polymer composition according to claim 1, wherein the weight ratio of the polymer block (I) based on the polymer block (II) in the block copolymer (a) falls between 95/5 and 10/90.

3. The thermoplastic polymer composition according to claim 1, wherein the chain extender comprises a branched aliphatic diol having a number average molecular weight of 100 to 400.

4. The thermoplastic polymer composition according to claim 1, wherein the conjugated diene polymer block in the polymer block (I) is at least one polymer block selected from isoprene polymer blocks, butadiene polymer blocks, copolymer blocks of isoprene and butadiene and hydrogenated products of those polymer blocks.

5. The thermoplastic polymer composition according to claim 4, wherein the conjugated diene polymer block in the polymer block (I) is at least one polymer block selected from isoprene polymer blocks, copolymer blocks of isoprene and butadiene and hydrogenated products of those polymer blocks in which the 1,2-bond and 3,4-bond content is 30 mol % or more.

6. The thermoplastic polymer composition according to claim 4, wherein the conjugated diene polymer block in the polymer block (I) is at least one polymer block selected from butadiene polymer blocks and hydrogenated products of those polymer blocks which contain 60 mol % or more of 1,2-bond.

7. The thermoplastic polymer composition according to claim 1, which further comprises a polymer (d) of a styrene-based polymer or an olefin-based polymer.

8. A molded article comprising the thermoplastic polymer composition according to claim 1.

9. A composite article comprising the thermoplastic polymer composition according to claim 1 and another material.

10. A hot-melt adhesive comprising the thermoplastic polymer composition according to claim 1.

11. A method for producing a thermoplastic polymer composition comprising [i] subjecting at least one block copolymer ($a_1$) selected from block copolymers which may be hydrogenated, having an aromatic vinyl compound polymer block, a conjugated diene polymer block and a terminal functional group reactive with at least one component selected from high polymer polyols, chain extenders and organic diisocyanates, to the reaction with a high polyol having a number average molecular weight of 500 to 10,000, a chain extender and an organic diisocyanate in the presence of at least one compound (b) selected from organic tin compounds, organic titanium compounds and tertiary amines; and [ii] adding at least one compound (c) of a phosphorus compound and a phenolic compound, to the resulting product, wherein the following conditions (i) to (v) are satisfied:
   - (i) the weight ratio of the block copolymer ($a_1$) based on the total weight of the high polymer polyol, the chain extender and the organic diisocyanate is in the range of 10:90 to 90:10;
   - (ii) the content of nitrogen derived from the organic diisocyanate is in the range of 1 to 6.5% by weight based on the total weight of the high polymer polyol, the chain extender and the organic diisocyanate;
   - (iii) the amount of the compound (b) is from 0.1 ppm to 0.2% by weight based on the total weight of the block copolymer ($a_1$), the high polymer polyol, the chain extender and the organic diisocyanate;
   - (iv) the amount of the compound (c) is from 1 ppm to 2% by weight based on the total weight of the block copolymer ($a_1$), the high polymer polyol, the chain extender and the organic diisocyanate; and
   - (v) the thermoplastic polymer composition has a melt viscosity satisfying the following Equation (I):

$$0.9 \leq \eta a_2 / \eta a_1 \leq 1.4 \qquad (I)$$

wherein $\eta a_1$ is a melt viscosity of the thermoplastic polymer composition when the urethane bond contained therein reaches to dissociation equilibrium at 200° C. under a load of 490.3 N (50 kgf), and $\eta a_2$ is a melt viscosity of the thermoplastic polymer composition when kept at 200° C. under the load of 490.3 N (50 kgf) for 60 minutes.

12. A method for producing a thermoplastic polymer composition comprising [i] subjecting at least one block copolymer ($a_1$) selected from block copolymers, which may be hydrogenated, having an aromatic vinyl compound polymer block, a conjugated diene polymer block and a terminal functional group reactive with at least one component selected from high polymer polyols, chain extenders and organic diisocyanates, to the reaction with a reaction product of a high polymer polyol having a number average molecular weight of 500 to 10,000, a chain extender and an organic diisocyanate, in the presence of at least one compound (b) selected from organic tin compounds, organic titanium compounds and tertiary amines; and [ii] adding at least one compound (c) of a phosphorus compound and a phenolic compound, to the resulting product, in which the following conditions (i) to (v) are satisfied:

(i) the weight ratio of the block copolymer ($a_1$) based on the weight of the reaction product of the high polymer polyol, the chain extender and the organic diisocyanate is in the range of 10:90 to 90:10;

(ii) the content of nitrogen derived from the organic diisocyanate is in the range of 1 to 6.5% by weight based on the total weight of the high polymer polyol, the chain extender and the organic diisocyanate;

(iii) the amount of the compound (b) is from 0.1 ppm to 0.2% by weight based on the total weight of the block copolymer ($a_1$) and the reaction product of the high polymer polyol, the chain extender and the organic diisocyanate;

(iv) the amount of the compound (c) is from 1 ppm to 2% by weight based on the total weight of the block copolymer ($a_1$) and the reaction product of the high polymer polyol, the chain extender and the organic diisocyanate; and (v) the thermoplastic polymer composition has a melt viscosity satisfying the following Equation (I):

$$0.9 \leq \eta a_2 / \eta a_1 \leq 1.4 \quad (I)$$

wherein $\eta a_1$ is a melt viscosity of the thermoplastic polymer composition when the urethane bond contained therein reaches to dissociation equilibrium at 200° C. under a load of 490.3 N (50 kgf), and $\eta a_2$ is a melt viscosity of the thermoplastic polymer composition when kept at 200° C. under the load of 490.3 N (50 kgf) for 60 minutes.

* * * * *